United States Patent [19]

Ortiz et al.

[11] Patent Number: 5,095,369

[45] Date of Patent: Mar. 10, 1992

[54] METHOD AND APPARATUS FOR IMPROVED JOB STREAM PRINTING IN AN ELECTRONIC PRINTER WITH VARIOUS FINISHING FUNCTION

[75] Inventors: Pedro R. Ortiz, Webster; Michael E. Farrell, Fairport; David L. Rasmussen, Fairport; John C. Austin, Rochester, all of N.Y.

[73] Assignee: Xerox Corporation, Stamford, Conn.

[21] Appl. No.: 590,416

[22] Filed: Sep. 28, 1990

[51] Int. Cl.⁵ ...................... H04N 1/21; G03G 21/00
[52] U.S. Cl. .................................. 358/296; 355/321; 355/324
[58] Field of Search ................. 358/296; 355/321, 324

[56] References Cited

U.S. PATENT DOCUMENTS

| | | | |
|---|---|---|---|
| 3,989,371 | 11/1976 | Valentine | 355/14 |
| 4,035,072 | 7/1977 | Deetz et al. | 355/14 |
| 4,054,380 | 10/1977 | Donohue et al. | 355/271 X |
| 4,126,390 | 11/1978 | Connin | 355/14 |
| 4,310,235 | 1/1982 | Lorenzo et al. | 355/6 |
| 4,558,942 | 12/1985 | Chiama | 355/323 X |
| 4,782,363 | 11/1988 | Britt et al. | 355/14 SH |
| 4,800,521 | 1/1989 | Carter et al. | 364/900 |
| 4,828,645 | 5/1989 | Van Bortel | 56/384 |
| 4,845,527 | 7/1989 | Maruta et al. | 355/210 |

Primary Examiner—Benjamin R. Fuller
Assistant Examiner—Eric Frahm

[57] ABSTRACT

Productivity in electronic printer incorporating finishing activities and operating in a job streaming mode are enhanced by utilizing software to calculate and predict the minimum delay corresponding to minimum skip pitches) in successive jobs requiring finishing activities such as binding and stapling. Printing and collating of sets of original scanned documents are controlled so that collated sets are successively presented by the printer to the finisher nearly coincident with conclusion of the finishing activity being accomplished for a current job. Additional software innovations allow job scheduling for jobs involving complex pitch time delays created by scanning simplex and duplex documents returned in random order. For this case optimum delay time is the cumulative finishing hardware delays as well as imaging/paper path delays. Still another feature is a predictive algorithym which is used to increase reliability of printer components by cycling down the printer between jobs in situations where the finishing activity for a current job requires an extraordinarily long time to complete compared with the cycle down/cycle up time of the printer.

24 Claims, 17 Drawing Sheets

Note: One unit of Hrdwr Delay is defined to be approximately 0.436 Sec. For multiple delays, 1 unit is executed at a time $T_{Fin}$ = Time required to complete finishing for all incomplete jobs and adjust finisher hardware position to receive Job#2.
$T_{Threshold}$ = Nominal time required to cycledown and cycleup the printer.

METHOD AND APPARATUS FOR IMPROVED JOB STREAM PRINTING IN AN ELECTRONIC PRINTER WITH VARIOUS FINISHING FUNCTION

BACKGROUND AND PRIOR ART STATEMENT

This invention relates to an electronic printer system, and, more particularly, to a printer system having improved multi-job stream printing and finishing capabilities.

Electronic printing systems typically employ a scanner for scanning image-bearing documents and conversion electronics for converting the image to image signals or pixels. The signals are stored and are read out successively to a printer for formation of the images on photoconductive output media such as a photoreceptor. When multiple jobs are to be sequentially printed, a process known as "job streaming" is commonly implemented. Job streaming is the ability of a printer system to complete successive printing jobs with a minimum of delay time between jobs. A control system associated with the image output terminal (IOT) of the machine identifies that multiple jobs have been scheduled, determines their characteristics and determines the necessary delay between jobs.

In other words, assuming a two-job scheduling, the controller will enable job number two to begin printing prior to completion of job number one.

It is common usage to have a quantity of jobs in the job stream which require some kind of finishing activity; e.g. collating, stitching and/or binding. Finishing activities require movement of mechanical components, e.g., movement of collating bins, stapler, heads and binding mechanisms. Jobs in the job stream typically are held, up until the finishing activity of the preceding job has been completed. These finishing delay times detract from the productivity of the printer. It would be desirable if a more efficient job overlap could be enabled to increase job streaming productivity.

In the prior art, U.S. Pat. No. 4,845,527 to Murata et al. discloses an automatic resetting mechanism which determines the operational status of a copying machine based on the elapsed time between successive copy instructions. Timers 1 and 2 are set for different durations of time at the termination of a first copy operation. If a copy instruction for a second copy operation is not issued to the system controller after timer 1 runs out, the controller automatically places the system in a predefined transient condition by setting a first group of copy conditions to a predetermined state. If a copy instruction still has not been issued after timer 2 runs out, the controller automatically resets the system back to start by setting a second group of copy conditions to a predetermined state. See col. 8, lines 35-col. 9, line 6.

U.S. Pat. No. 4,310,235 to Lorenzo et al. discloses a job stream programmer which allows an operator to pre-program a copying machine for automatically processing a plurality of the job production runs in succession. See col. 6, lines 37-57 and FIG. 6.

U.S. Pat. No. 3,989,371 to Valentine discloses a multimode copier/duplicator which includes a delay in mode change in response to an operator command in order to avoid any interruptions for a copying process. The delay mode is a change in logic in a cycle-out logic circuit wherein a signal is initiated by the operator to change one mode to another.

U.S. Pat. No. 4,035,072 to Deetz et al discloses a programmable controller to control and duplex mode. The programmable controller consists of a control program comprising a set of program instructions which enables the controller to generate a control signal to begin a process device in a timed manner. In operating the device in response to the instructions, the control program calculates the timing information in order to control the operating components of the machine.

U.S. Pat. No. 4,800,521 to Carter et al discloses a task control manager which controls a machine that executes a plurality of tasks. The method of control of the machine comprises the steps of: (1) involving a task of execution; (2) allocating operating system memory locations; (3) inserting in memory locations which relate to the tasks; (4) determining the processor which the task resides; (5) sending a request to the processor; and (6) initiating said task execution in response to a Directive.

The above identified references are generally illustrative of known prior art techniques for enabling multiple jobs in reprographic environment but utilizing programming logic to provide timing for the various interacting sub-system components. The prior art, however, does not disclose ways for optimizing through put efficiency for those jobs requiring finishing operations to be performed.

OBJECTS AND SUMMARY OF THE INVENTION

It is therefore an object of the present invention to optimize multi-job streaming productivity in an electronic printer by minimizing the delay time between jobs scheduled to a common finisher destination.

It is a still further object of the invention to recognize situations wherein a required delay between sequential finishing jobs is of sufficiently long duration, that is more efficient to cycle down the processor during the current job finishing operation to extend the life of system components such as the imaging photoreceptor.

To achieve the foregoing and other objects, a printing apparatus is provided which automatically determines the optimum delay expressed as skip pitches which must be introduced to prevent sheet scheduling from overtaking synchronous finishing operations.

More particularly, the present invention is directed to an electronic printer having a copy set finisher wherein a plurality of consecutively printed sets are provided with a specified finishing activity, a method of optimizing set overlap in said finisher including the steps of: determining the number of finisher pitches required to complete finishing activity on a first (current) set, determining the number of print pitches required to image the second (next) set, subtracting the print pitches from the finisher pitches to obtain a minimum number of finisher skip pitches and delaying arrival of the next set to the finisher by the number of said finisher skip pitches.

DESCRIPTION OF THE INVENTION

Figure 1:
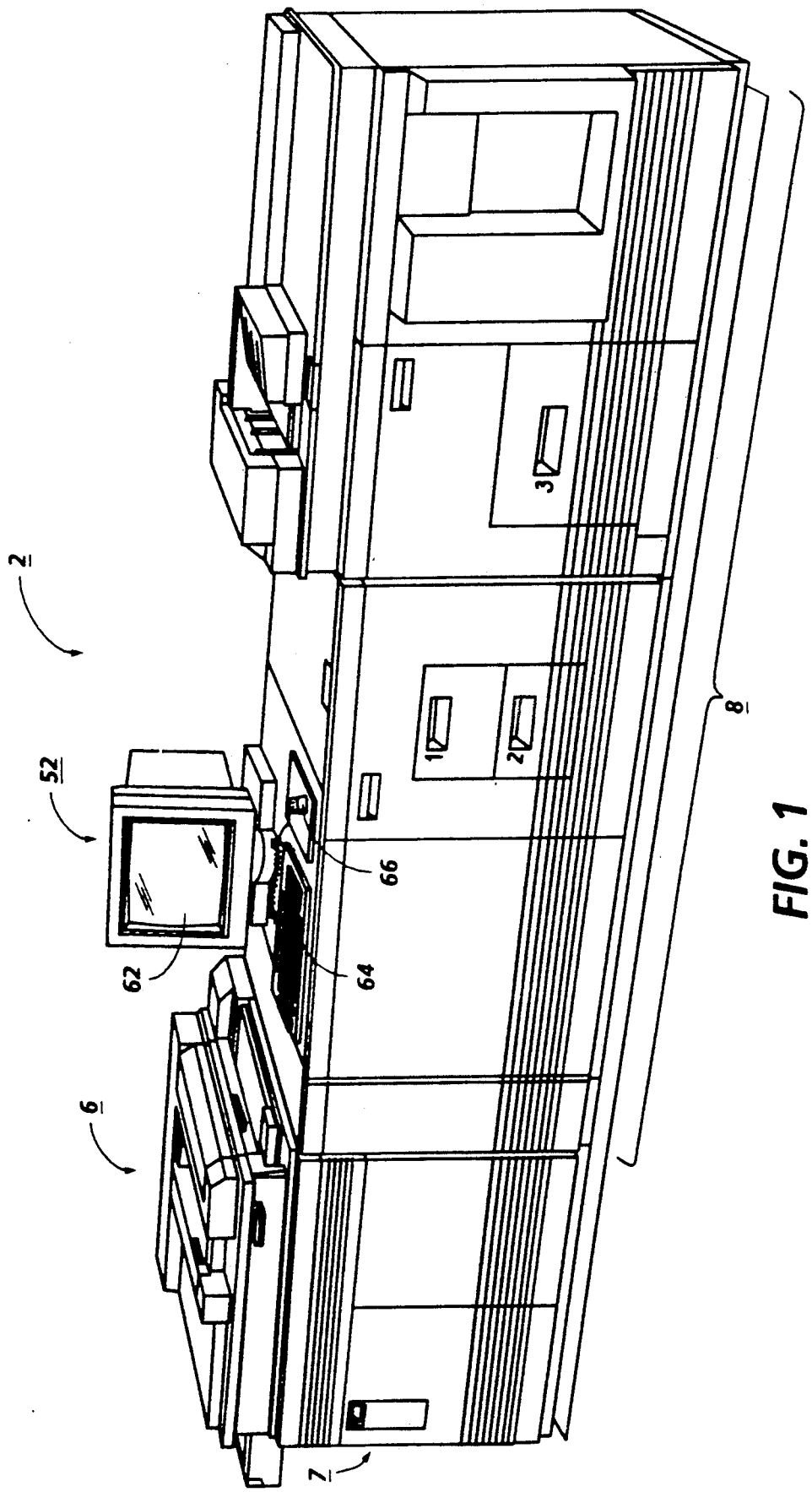
FIG. 1 is a view depicting an electronic printing system incorporating the finisher and controlling software of the present invention.
Figure 2:
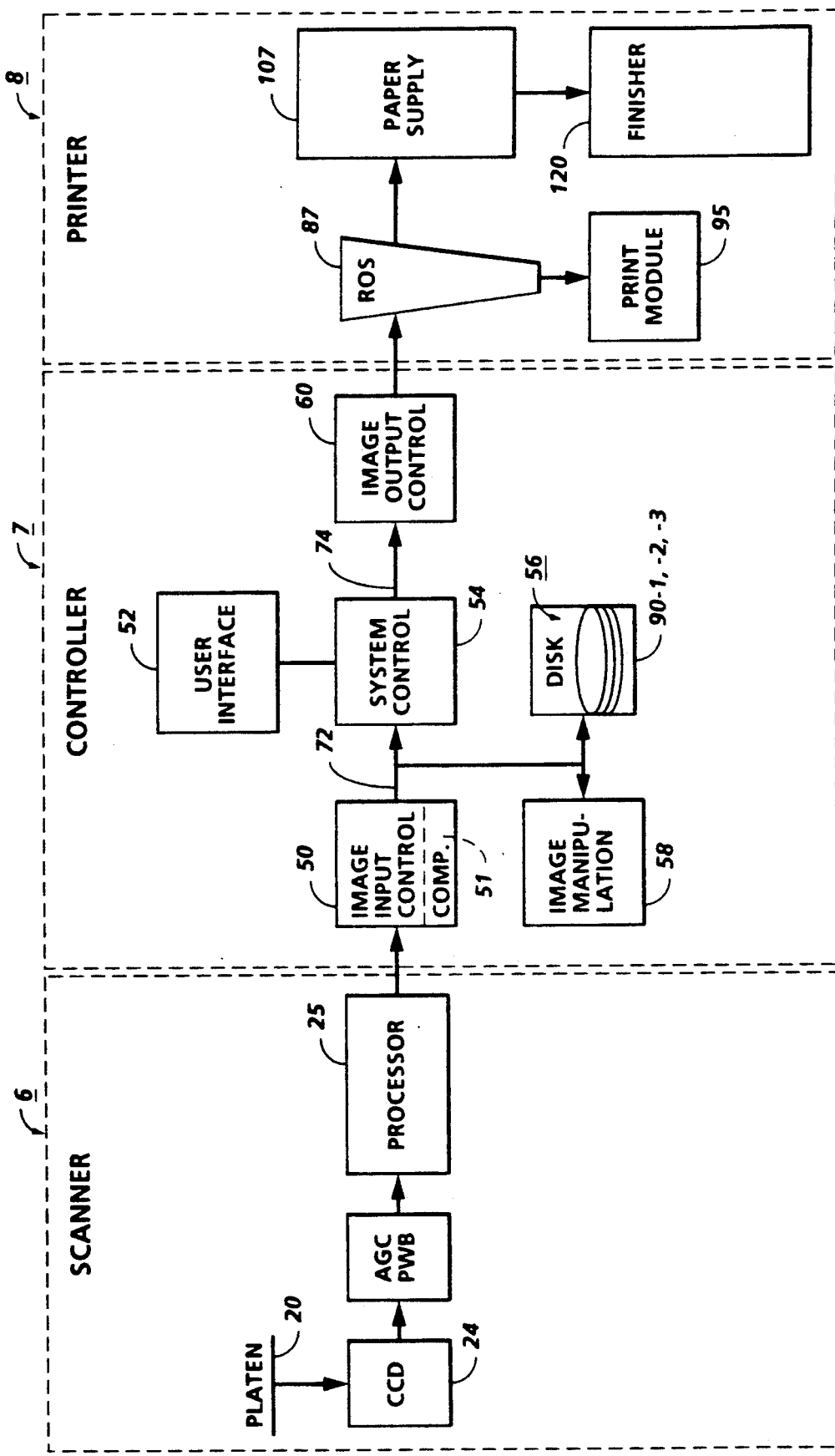
FIG. 2 is a block diagram depicting the major elements of the printing system shown in FIG. 1.

Referring to FIGS. 1 and 2, there is shown an exemplary laser-based, printing system 2 for processing printing and finishing jobs in accordance with the teachings of the present invention. Printing system 2 for purposes of explanation is divided into a scanner section 6, controller section 7, and printer section 8. While a specific printing system will be shown and described, the present invention may be used with other types of printing systems such as ink jet, ionographic, full frame flash exposure, etc.

Figure 3:
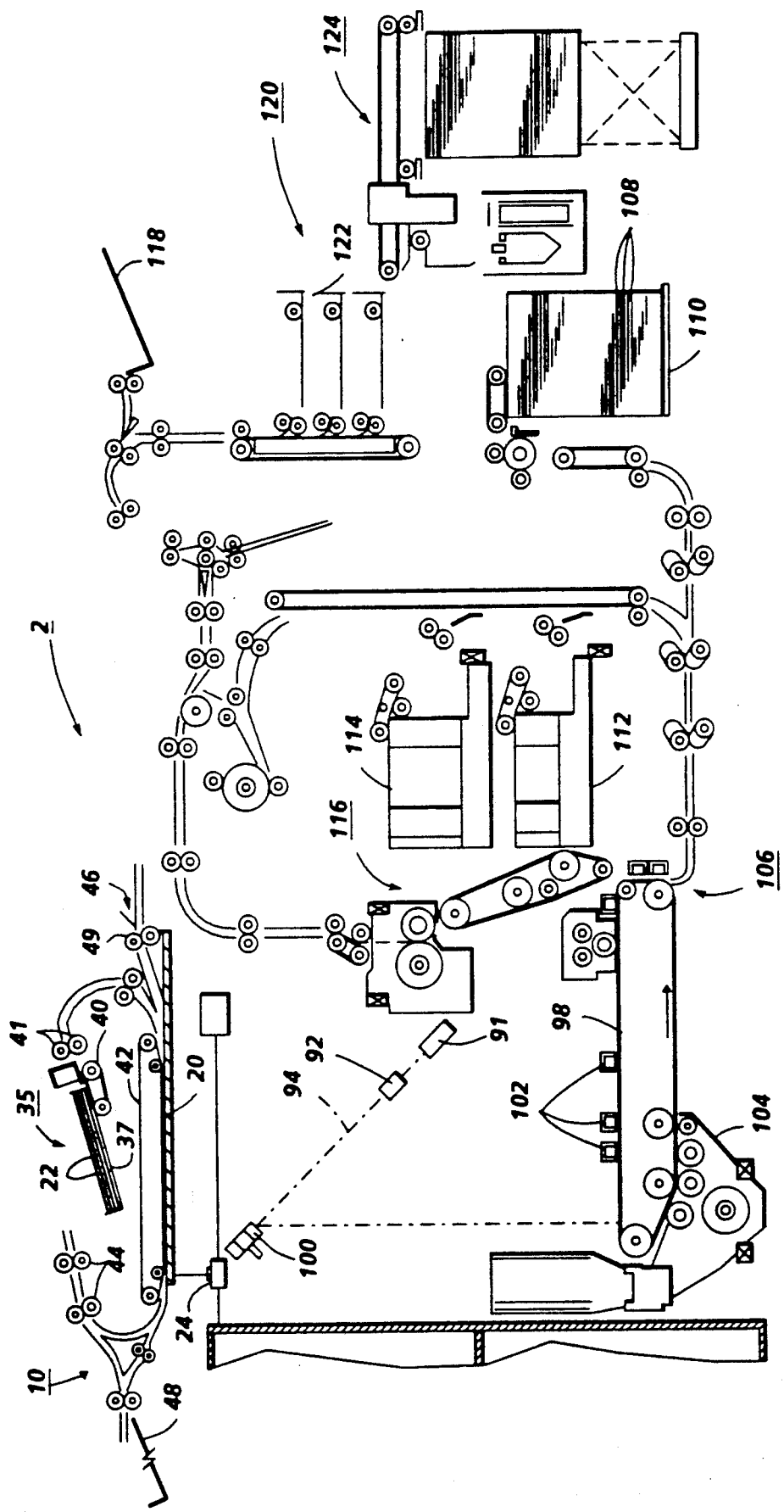
FIG. 3 is a plan view illustrating the principal mechanical components of the printing system shown in FIG. 1.
Figure 4:
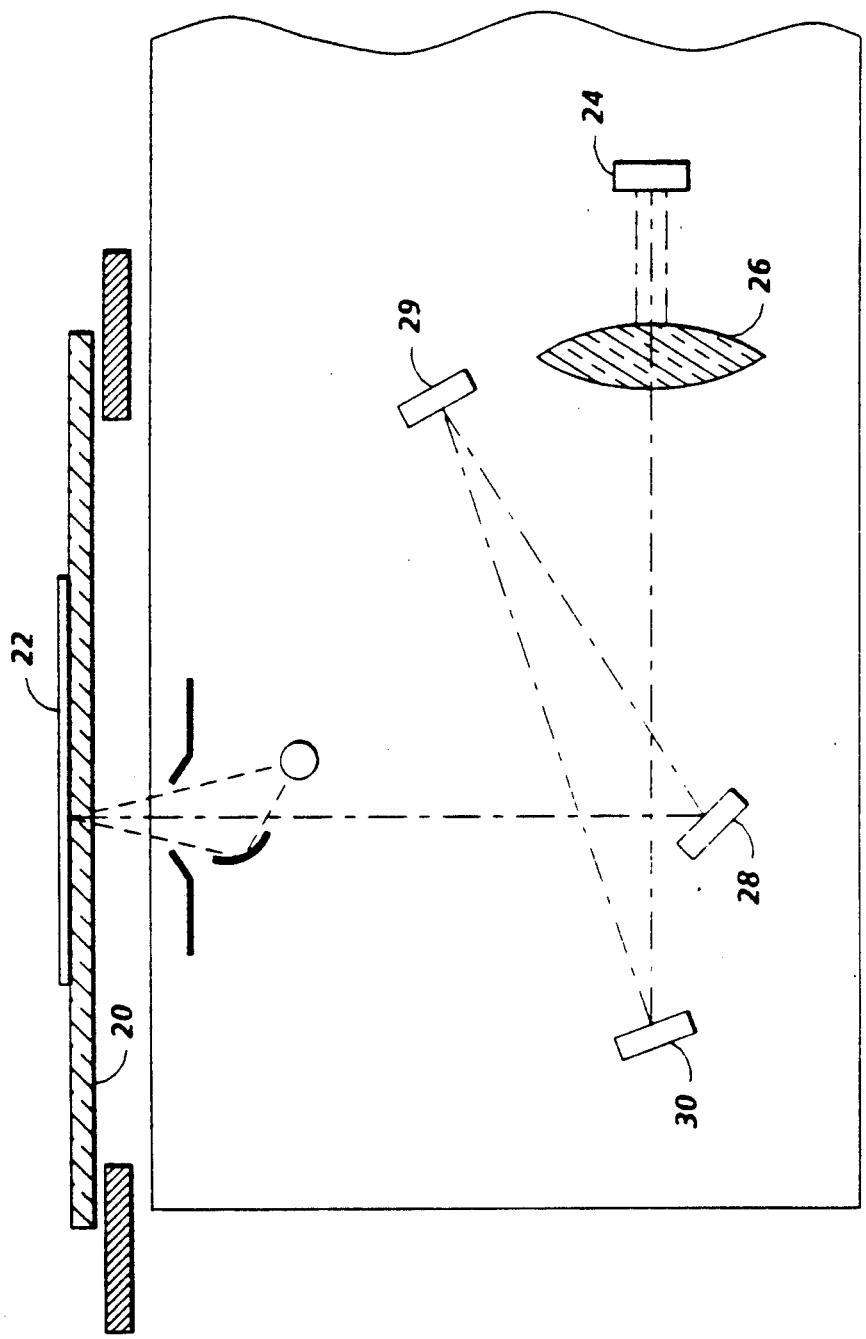
FIG. 4 is a schematic view showing certain construction details of the document scanner for the printing system shown in FIG. 1.

Referring particularly to FIGS. 2-4, scanner section 6 incorporates a transparent platen 20 on which the document 22 to be scanned is located. One or more linear arrays 24 are supported for reciprocating scanning movement below platen 20. Lens 26 and mirrors 27, 28, and 29, cooperate to focus on array 24 a line like segment reflected from platen 20 and the document being scanned thereon. Array 24 provides image signals or pixels representative of the image scanned which after suitable processing by processor 25, are output to controller section 7.

Processor 25 converts the analog image signals output by array 24 to digital signals and processes the image signals as required to enable system 2 to store and handle the image data in the form required to carry out the job programmed. Processor 25 also provides enhancements and changes to the image signals such as filtering, thresholding, screening, cropping, reduction/enlarging, etc. Following any changes and adjustments in the job program, the document must be rescanned.

Documents 22 to be scanned may be located on platen 20 for scanning by automatic document handler (ADF) 35 operable in either a Recirculating Document Handling (RDH) mode or a Semi-Automatic Document Handling (SADH) mode. A manual mode including a Book mode and a Computer Forms Feeder (CFF) mode are also provided, the latter to accommodate documents in the form of computer fanfold. For RDH mode operation, document handler 35 has a document tray 37 in which documents 22 are arranged in stacks or batches. The documents 22 in tray 37 are advanced by vacuum feed belt 40 and document feed rolls 41 and document feed belt 42 onto platen 20 where the document is scanned by array 24. Following scanning, the document is removed from platen 20 by belt 42 and returned to tray 37 by document feed rolls 44.

For operation in the SADH mode, a document entry slot 46 provides access to the document feed belt 42 between tray 37 and platen 20 through which individual documents may be inserted manually for transport to platen 20. Feed rolls 49 behind slot 46 form a nip for engaging and feeding the document to feed belt 42 and onto platen 20. Following scanning, the document is removed from platen 20 and discharged into catch tray 48.

For operation in the CFF mode, computer forms material is fed through slot 46 and advanced by feed rolls 49 to document feed belt 42 which in turn advances a page of the fanfold material into position on platen 20.

Referring to FIGS. 2 and 3, printer section 8 comprises a laser type printer and for purposes of explanation is separated into a Raster Output Scanner (ROS) section 87, Print Module Section 95, Paper Supply section 107, and Finisher 120. ROS 87 has a laser 91, the beam of which is split into two imaging beams 94. Each beam 94 is modulated in accordance with the content of an image signal input by acousto-optic modulator 92 to provide dual imaging beams 94. Beams 94 are scanned across a moving photoreceptor 98 of Print Module 95 by the mirrored facets of a rotating polygon 100 to expose two image lines on photoreceptor 98 with each scan and create the latent electrostatic images represented by the image signal input to modulator 92. Photoreceptor 98 is uniformly charged by corotrons 102 at a charging station preparatory to exposure by imaging beams 94. The latent electrostatic images are developed by developer 104 and transferred at transfer station 106 to a print media 108 delivered by Paper Supply section 107. Media 108, as will appear, may comprise any of a variety of sheet sizes, types, and colors. For transfer, the print media is brought forward in timed registration with the developed image on photoreceptor 98 from either a main paper tray 110 or from auxiliary paper trays 112, or 114. The developed image transferred to the print media 108 is permanently fixed or fused by fuser 116 and the resulting prints discharged to either output trays 118, or to output collating trays 119A, B, C in finisher 120. Finisher 120 includes a stitcher 122 for stitching (stapling) the prints together to form books, a thermal binder 124 for adhesively binding the prints into books and a stacker 125. A finisher of this type is disclosed in U.S. Pat. Nos. 4,828,645 and 4,782,363 whose contents are hereby incorporated by reference.

Referring to FIGS. 1, 2 and 5, controller section 7 is, for explanation purposes, divided into an image input controller 50, User Interface (UI) 52, system controller 54, main memory 56, image manipulation section 58, and image output controller 60.

The scanned image data input from processor 25 of scanner section 6 to controller section 7 is compressed by image compressor/processor 51 of image input controller 50 on PWM (printed wiring board) 70-3. As the image data passes through compressor/processor 51, it is segmented into slices N scan lines wide, each slice having a slice pointer. The compressed image data together with slice pointers and any related image descriptors providing image specific information (such as height and width of the document in pixels, the compression method used, pointers to the compressed image data, and pointers to the image slice pointers) are placed in an image file. The image files, which represent different print jobs, are temporarily stored in system memory 61 which comprises a Random Access Memory or RAM pending transfer to main memory 56 where the data is held pending use.

As best seen in FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, to obtain system operating information, instructions, programming information, diagnostic information, etc. Items displayed on touchscreen 62 such as files and icons are actuated by either touching the displayed item on screen 62 with a finger or by using mouse 66 to point cursor 67 to the item selected and keying the mouse.

Main memory 56 has plural hard disks 90-1, 90-2, 90-3 for storing machine Operating System software, machine operating data, and the scanned image data currently being processed.

When the compressed image data in the main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 on PWB 70-6 where the additional processing steps such as collation, make ready, decomposition, etc are carried out. Following processing, the data may be returned to main memory 56, sent to UI 52 for display on touchscreen 62, or sent to image output controller 60.

Figure 5A:
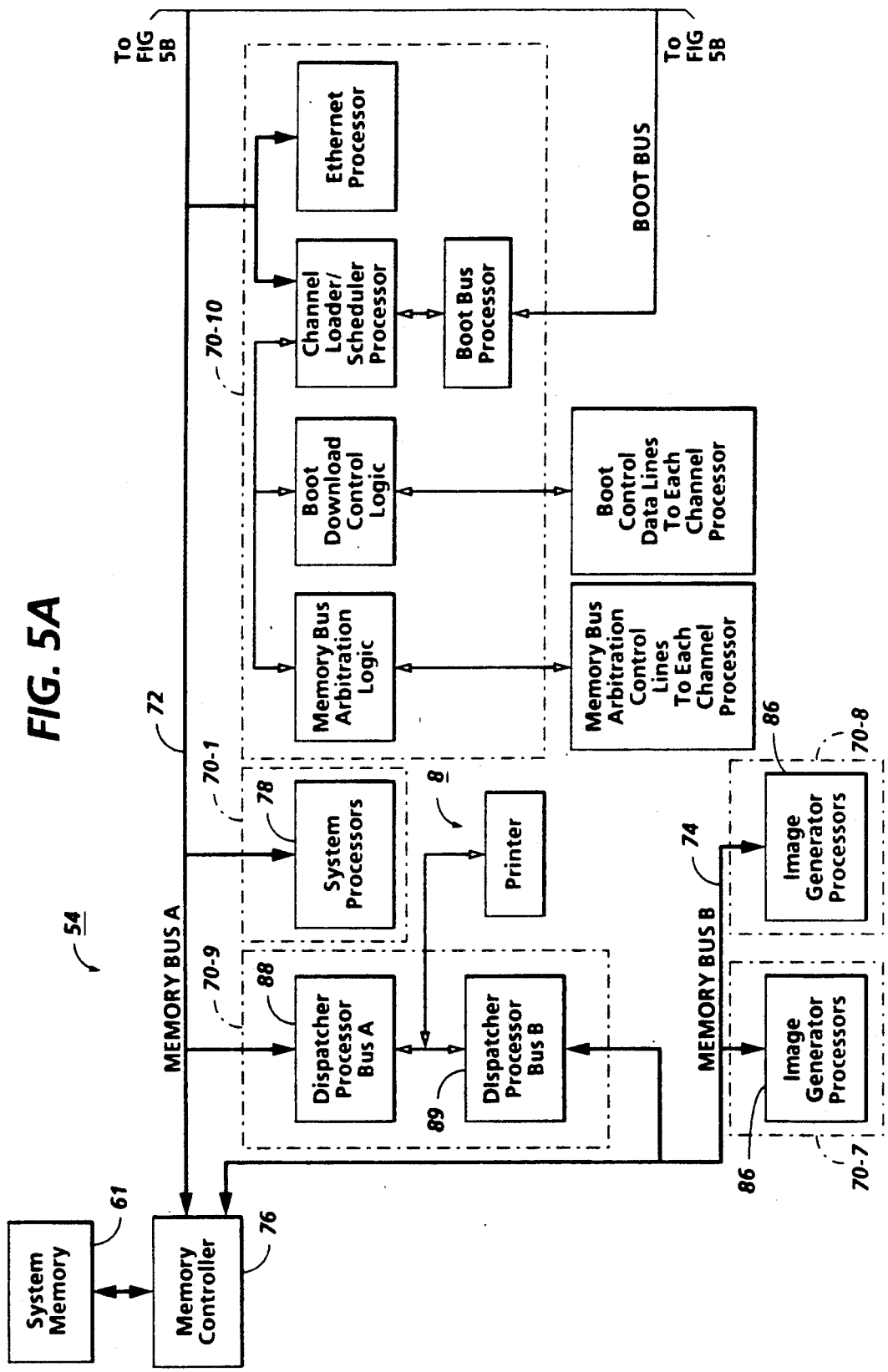
FIGS. 5A, 5B, and 5C comprise a schematic block diagram showing the major parts of the control section for the printing system shown in FIG. 1.

Image data output to image output controller 60 is decompressed and readied for printing by image generating processors 86 of PWBs 70-7, 70-8 (seen in FIG. 5A). Following this, the data is output by dispatch processors 88, 89 on PWB 70-9 to printer section 8. Image data sent to printer section 8 for printing is normally purged from memory 56 to make room for new image data.

Figure 5B:
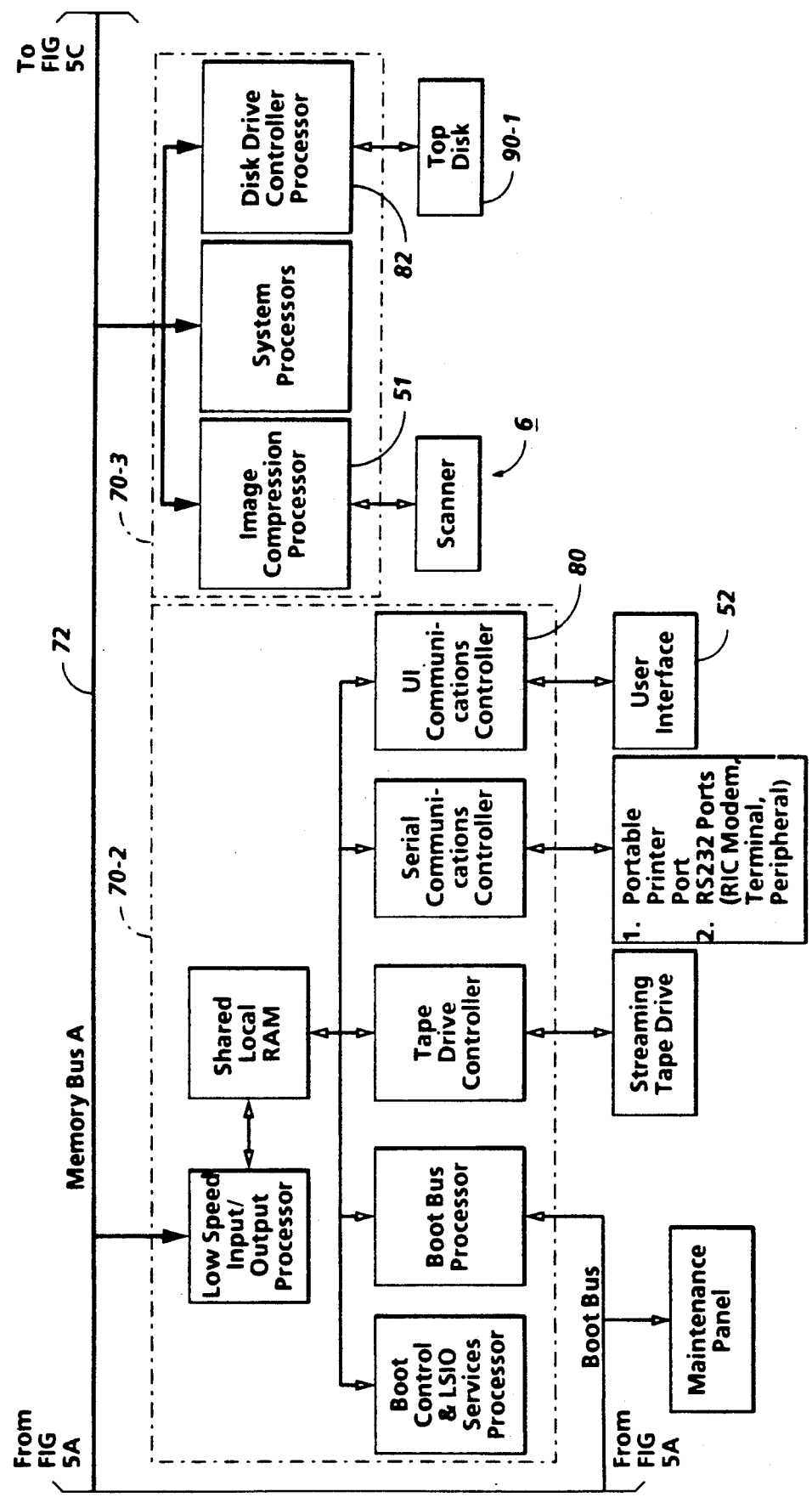
Figure 5C:
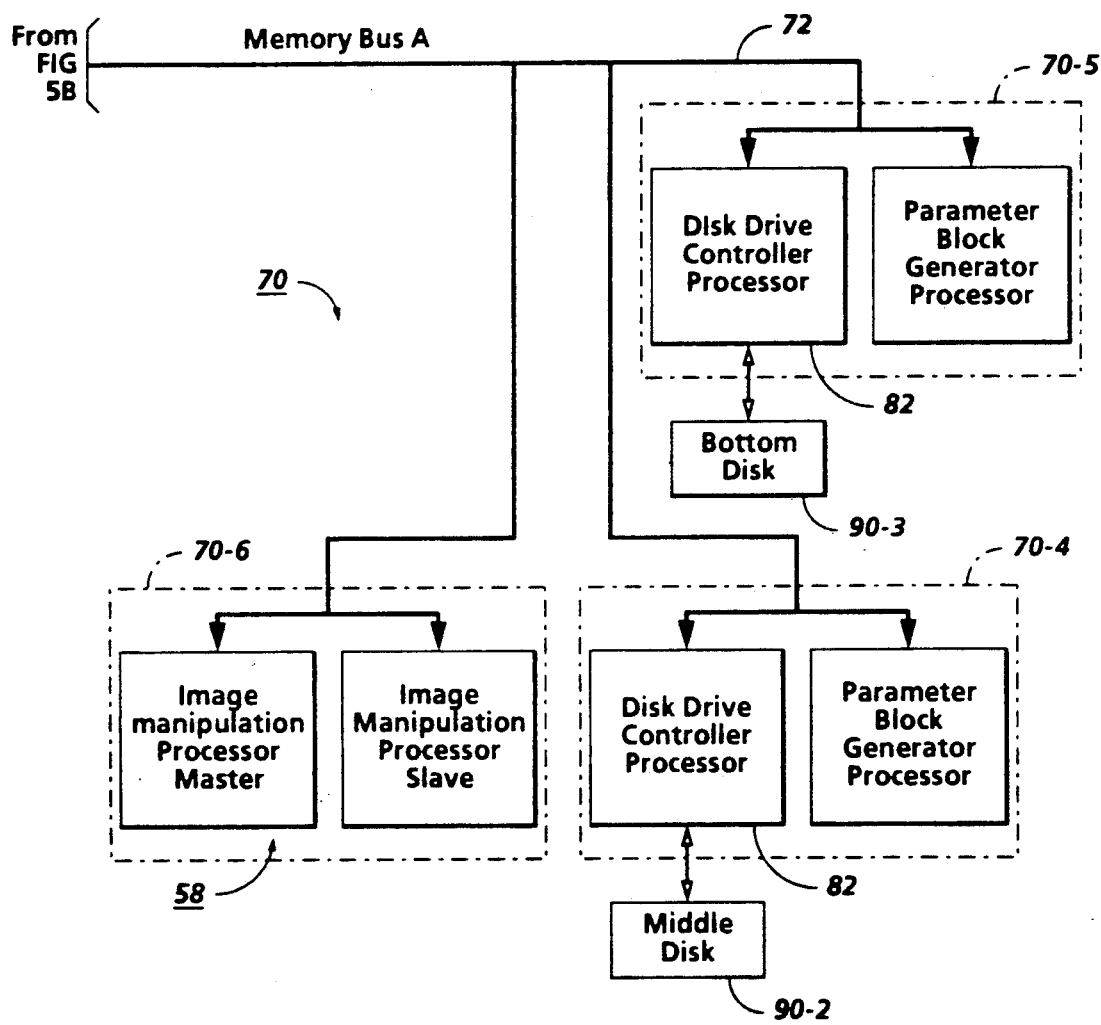

Referring particularly to FIGS. 5A-5C, control section 7 includes a plurality of Printed Wiring Boards (PWBs) 70, PWBs 70 being coupled with one another and with System Memory 61 by a pair of memory buses 72, 74. Memory controller 76 couples System Memory 61 with buses 72, 74. PWBs 70 include system processor PWB 70-1 having plural system processors 78; low speed I/O processor PWB 70-2 having UI communication controller 80 for transmitting data to and from UI 52; PWBs 70-3, 70-4, 70-5 having disk drive controller/processors 82 for transmitting data to and from disks 90-1, 90-2, 90-3 respectively of main memory 56 (image compressor/processor 51 for compressing the image data is on PWB 70-3); image manipulation PWB 70-6 with image manipulation processors of image manipulation section 58; image generation processor PWBs 70-7, 70-8 with image generation processors 86 for processing the image data for printing by printer section 8; dispatch processor PWB 70-9 having dispatch processors 88, 89 for controlling transmission of data to and from printer section 8; and boot control-arbitration-scheduler PWB 70-10.

Figure 6:
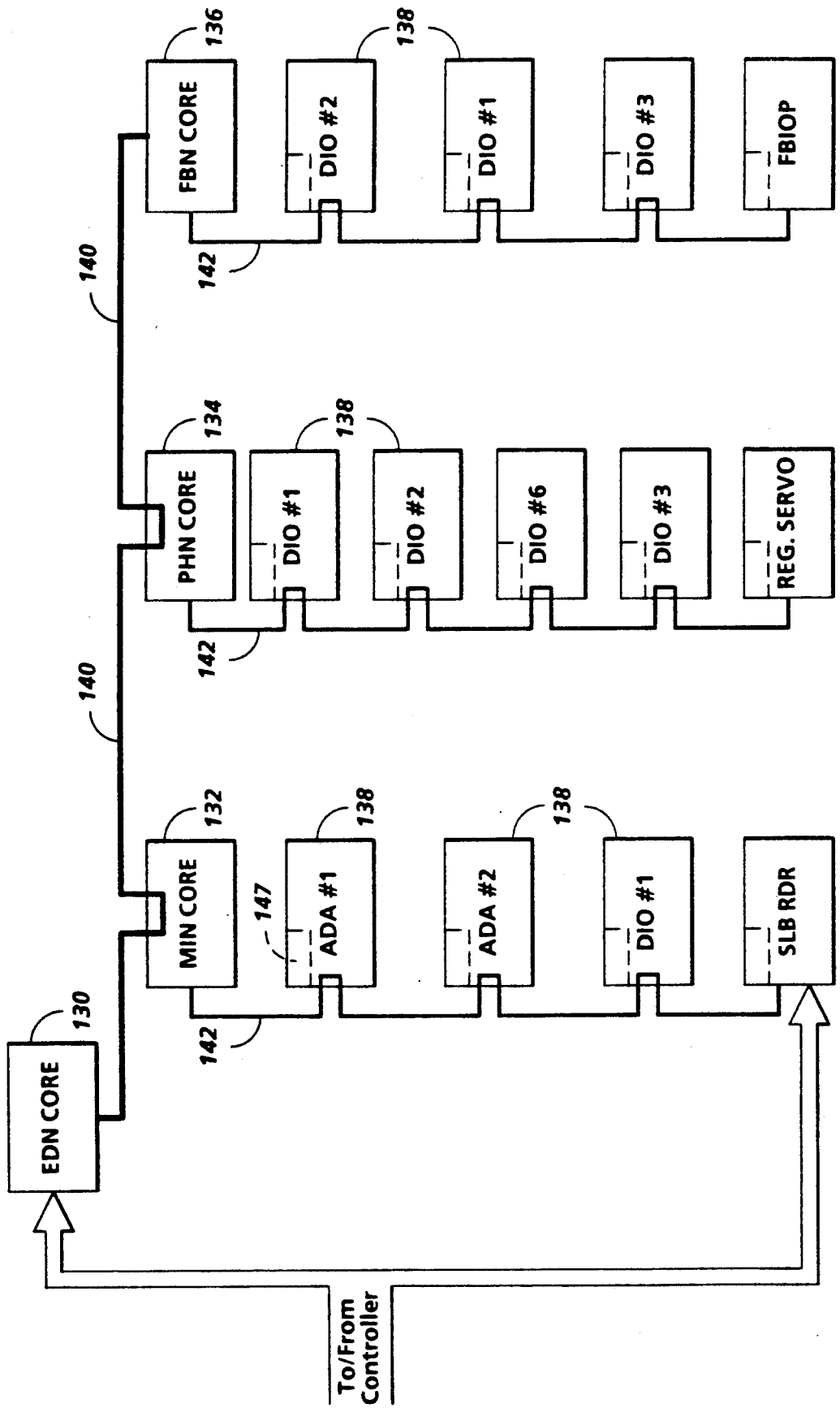
FIG. 6 is a block diagram of the Operating System, together with Printed Wiring Boards and shared line connections for the printing system shown in FIG. 1.

Referring particularly to FIG. 6, system control signals are distributed via a plurality of printed wiring boards (PWBs). These include EDN (electronic data node) core PWB 130, Marking Imaging core PWB 132, Paper Handling core PWB 134, and Finisher Binder core PWB 136 together with various Input/Output (I/O) PWBs 138. A system bus 140 couples the core PWBs 130, 132, 134, 136 with each other and with controller section 7 while local buses 142 serve to couple the I/O PWBs 138 with each other and with their associated core PWB.

On machine power up, the Operating System software is loaded from memory 56 to EDN core PWB 130 and from there to the remaining core PWBs 132, 134, 136 via bus 140, each core PWB 130, 132, 134, 136 having a boot ROM 147 for controlling down-loading of Operating System software to the PWB, fault detection, etc. Boot ROMs 147 also enable transmission of Operating System software and control data to and from PWBs 130, 132, 134, 136 via bus 140 and control data to and from I/O PWBs 138 via local buses 142. Additional ROM, RAM, and NVM memory types are resident at various locations within system 2.

Figure 7:
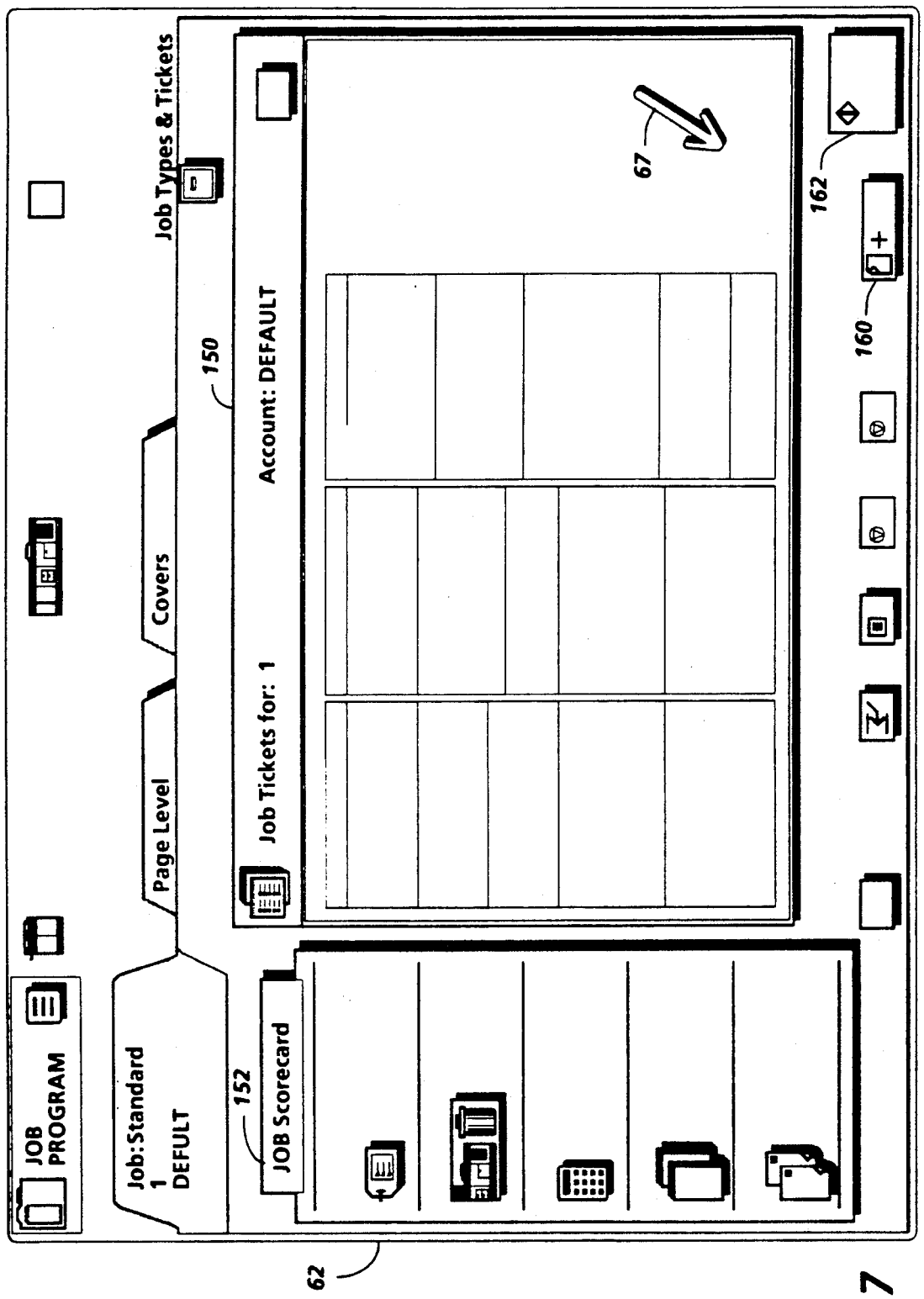
FIG. 7 is a view depicting an exemplary job programming ticket and job scorecard displayed on the User Interface (UI) touchscreen of the printing system shown in FIG. 1.

Referring to FIG. 7, jobs are programmed in a Job Program mode in which there is displayed on touchscreen 62 a Job Ticket 150 and a Job Scorecard 152 for the job being programmed. Job Ticket 150 displays various job selections programmed, while Job Scorecard 152 displays the basic instructions to the system for printing the job.

Figure 8:
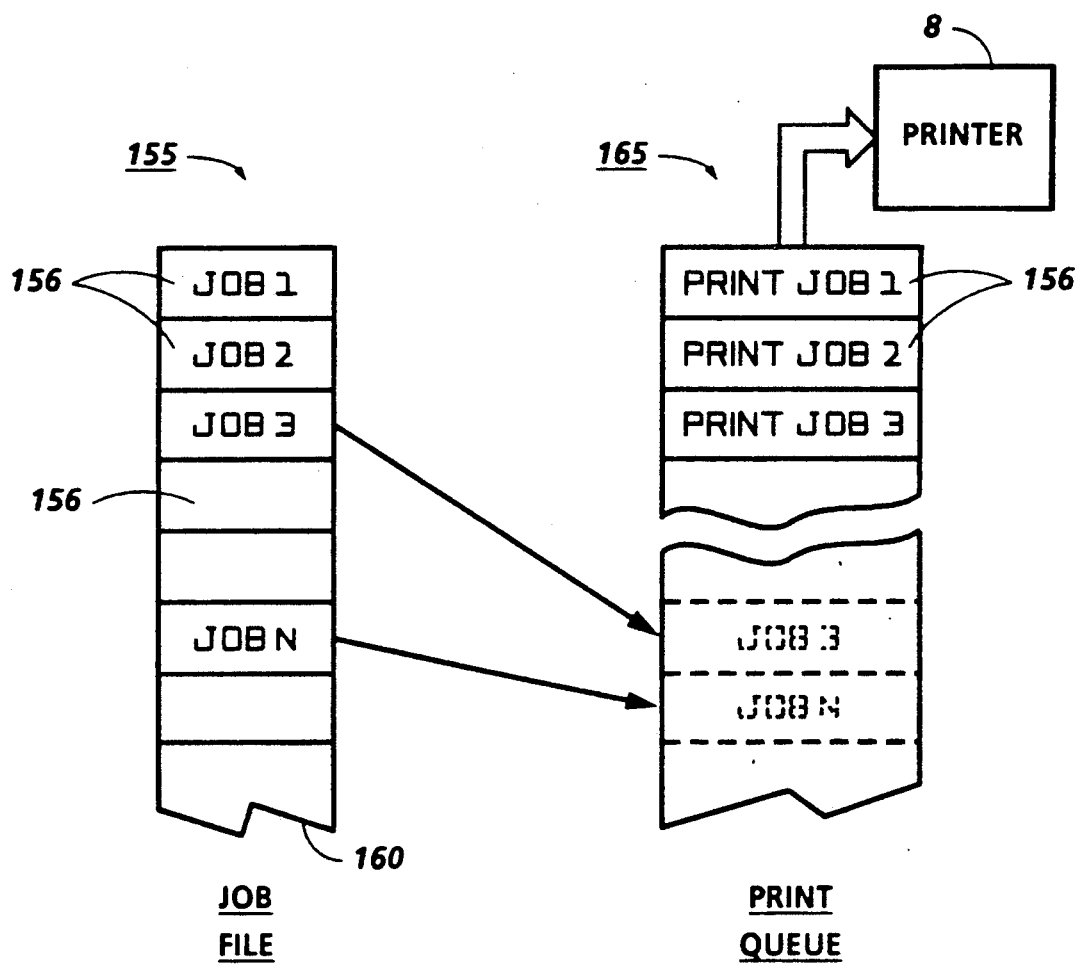
FIG. 8 is a view depicting the Job File and Print Queue.
Figure 9:
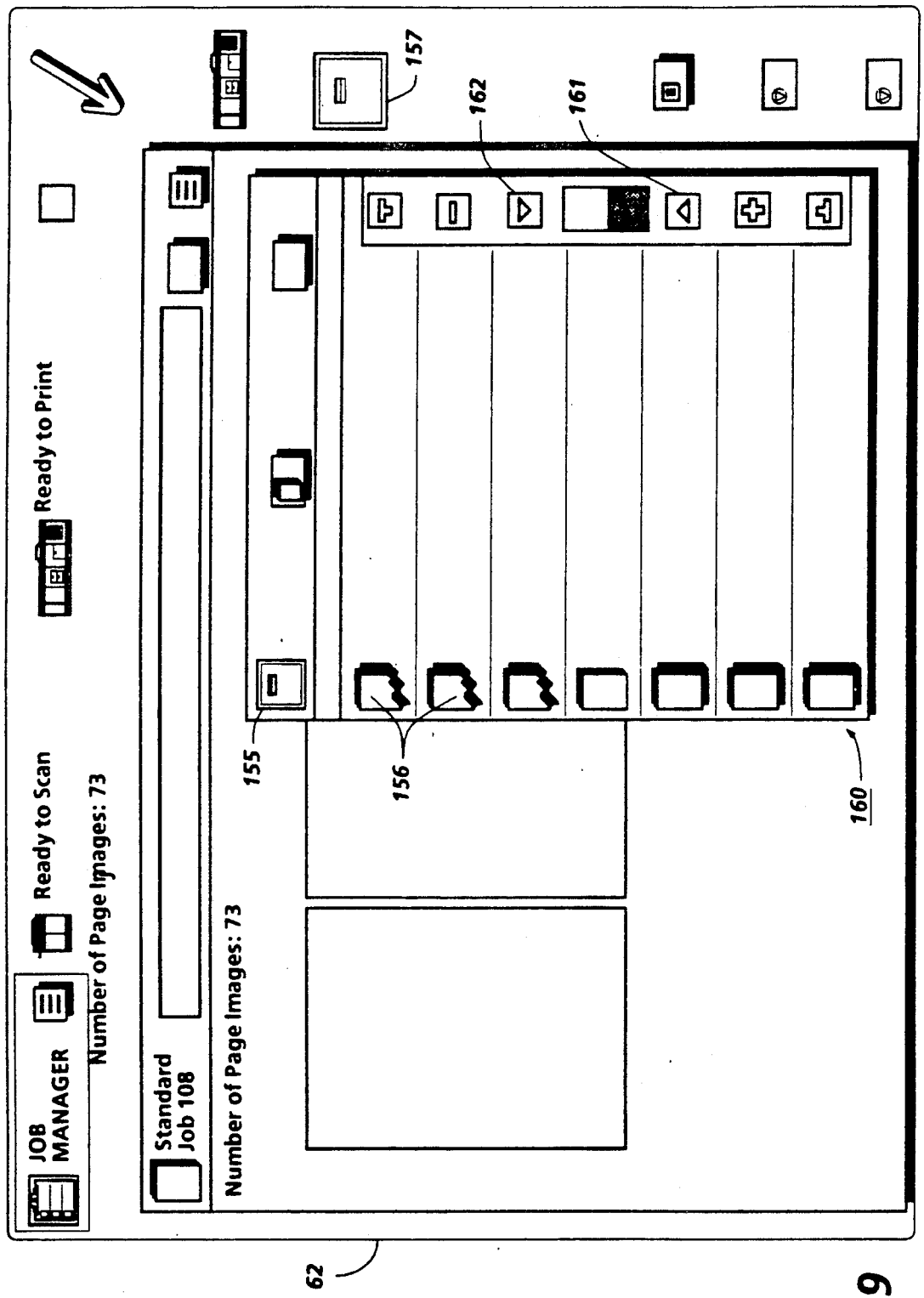
FIG. 9 is a view of the User Interface touchscreen display depicting a queue of typical Job Files for jobs in the system.

Referring to FIGS. 8 and 9, the image files are arranged in a job file 155, with the print jobs 156 numbered consecutively in the order in which the print jobs are scanned in. Where the operator wishes to see the jobs currently residing in job file 155, as for example, to select jobs to be moved to the print queue for printing, a SYSTEM FILE icon 157 (FIG. 9) on touchscreen 62 is actuated. This displays an image queue 160 of the jobs 156 currently in the job file on screen 62, an example of which is shown in FIG. 9. Each job is identified by a descriptor showing the type of job, job number, number of prints, etc. By using up and down scrolling icons 161, 162, the operator can scroll the list of jobs where the number of jobs in the job file is too large to be simultaneously displayed on touchscreen 62.

Figure 10:
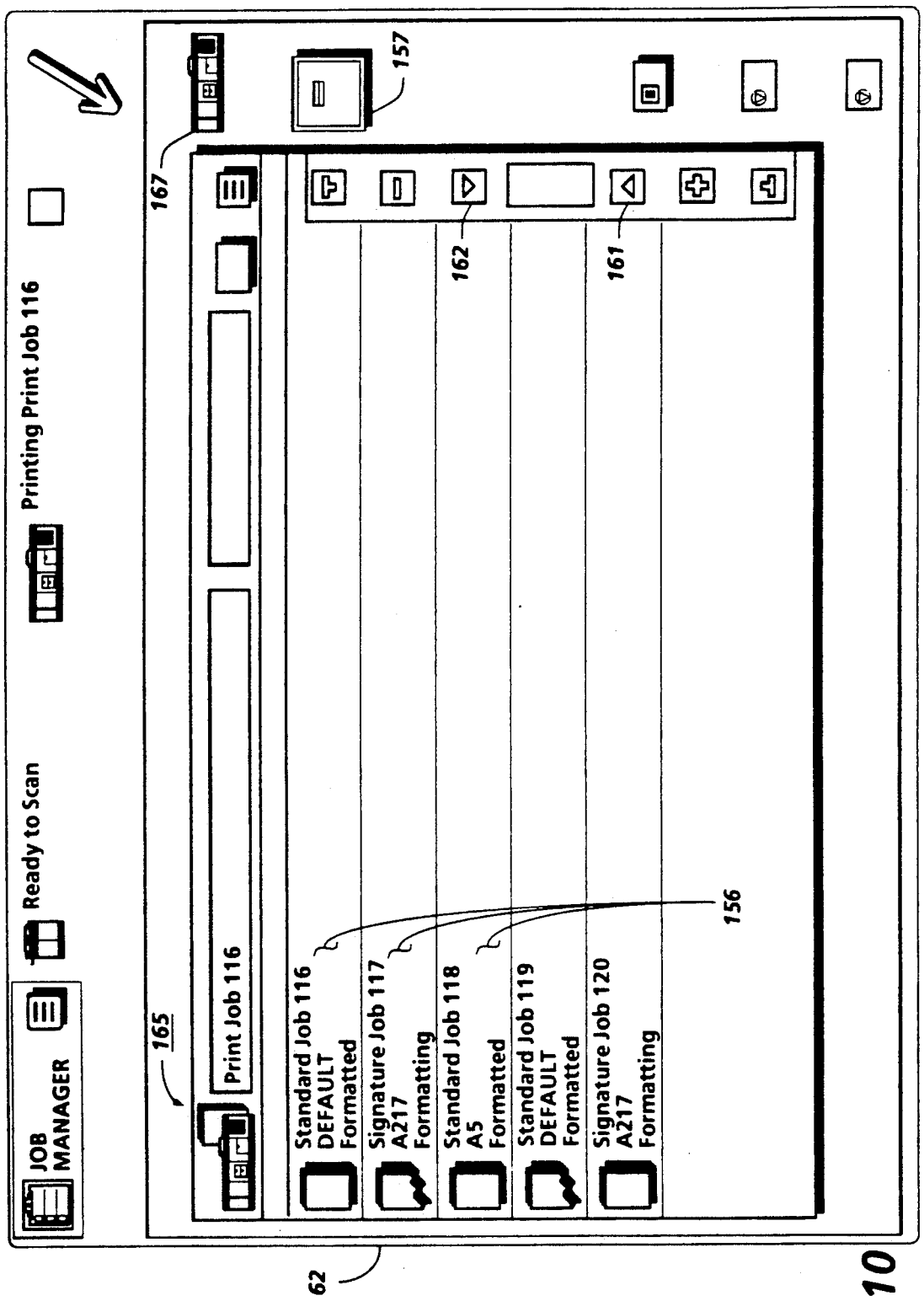
FIG. 10 is a view of the User Interface touchscreen display depicting a print queue of typical jobs to be printed.

Referring also to FIG. 10, to print a job 156, the job is moved into a print queue 165. A PRINTER QUEUE icon 167 on touchscreen 62, when actuated, displays the current print queue with a list of the jobs in the queue on touchscreen 62, an example of which is shown in FIG. 10. Each job in print queue 165 has a job descriptor identifying the job, job number, quantity to be printed, paper color, finishing type, etc. Print queue 165 is ordered by priority and time of arrival of the job in the print queue. Other priority orderings may be envisioned.

Where it is desired to process a job 156 before printing as, for example, to edit a job, the image queue 160 is displayed (if not already displayed on screen 62) and the particular job identified. The parts of the jobs image file required for the processing selected are accessed, the image data decompressed and converted to the resolution required for display on screen 62. When processing is completed, the image data is compressed and returned to main memory 56.

A job 156 in print queue 165 may be removed from queue 165 any time before printing has commenced and returned to the job file 155. In that case, the image file removed loses its position in the print queue.

For printing a job, the image file having compressed image data, image slice pointers, and descriptors of the job is read from disks 90-1, 90-2, 90-3 of main memory 56 into system memory 61. The image data is formatted and processed in blocks called bands. Band descriptors, which provide descriptions of the objects within a page, base addresses for all of the scan lines in the band, the start addresses for each band, and the starting position for each page, are created.

Using the image descriptors, band descriptors, and image slice pointers, packets of information, referred to as image parameter blocks containing all the information needed for the image generation processors 86 (seen in FIG. 5A) to retrieve the image data for processing and printing, are created. Processors 86 include a decoder, depredictor, and image generating logic to in effect decompress the image data and provide the binary image data used by printer section 8 to make prints.

Following printing, the image file for the job is normally purged from memory 56 to make room for new job.

Figure 11:
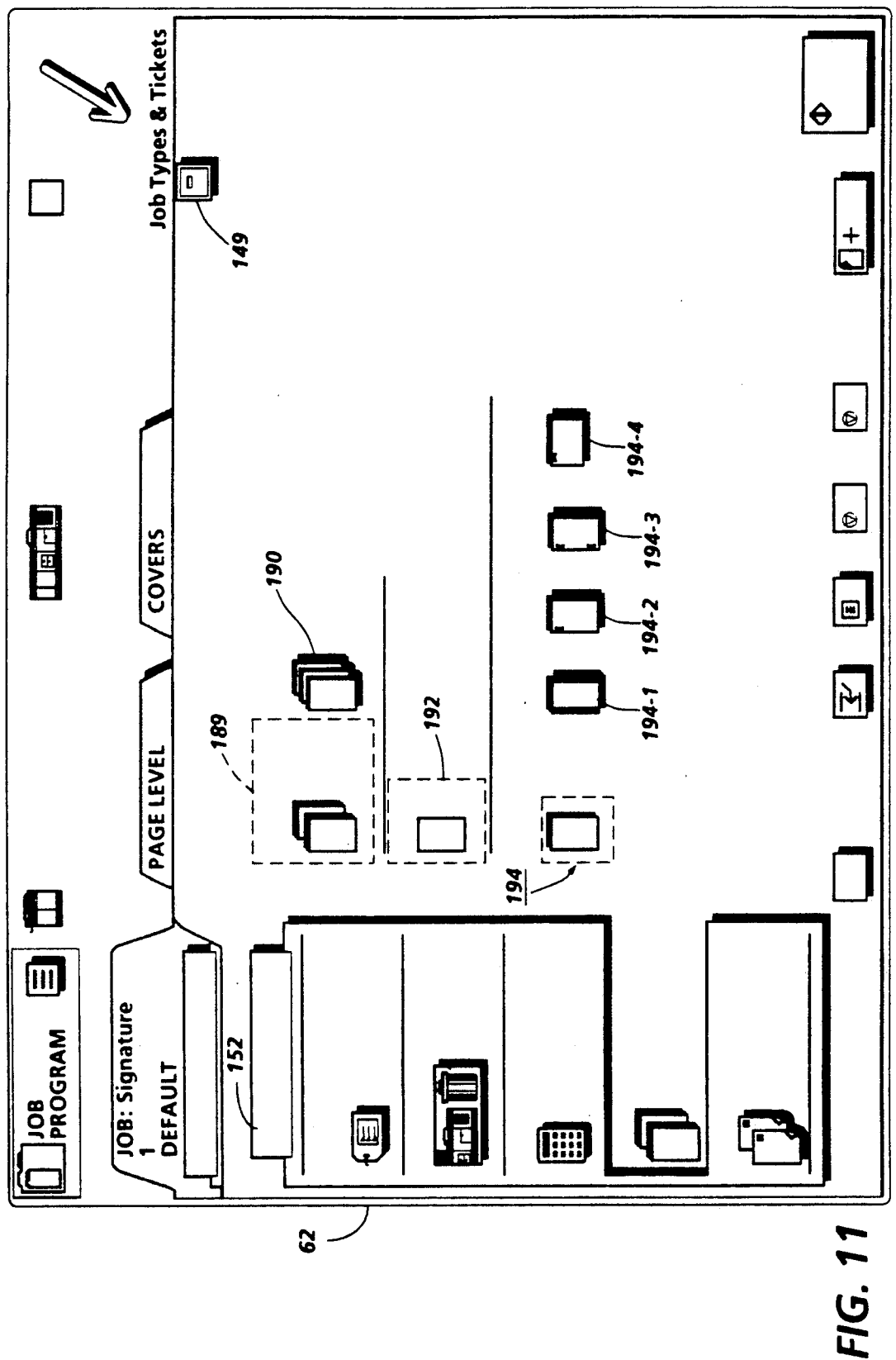
FIG. 11 is a view of the user interface touch screen display depicting the various finishing options available to an operator.
Figure 12:
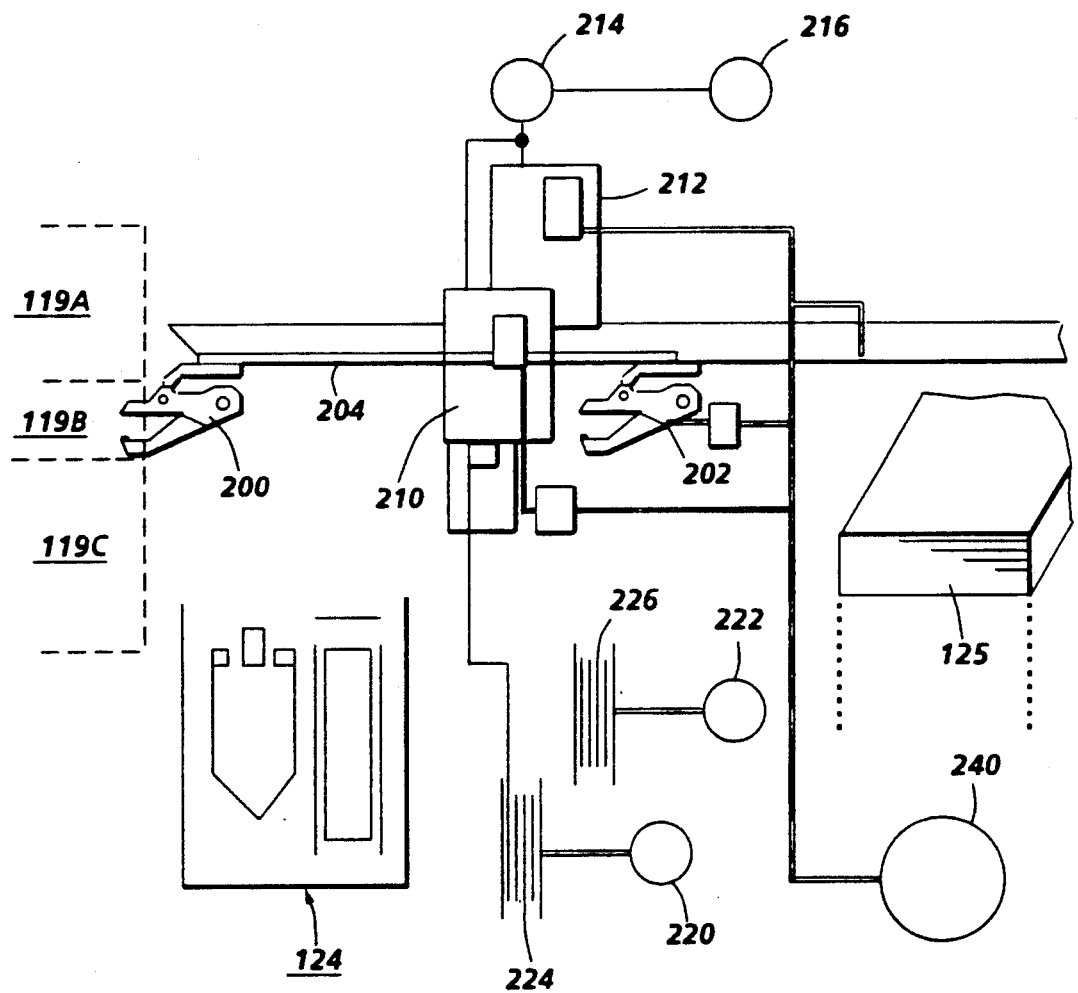
FIG. 12 is an expanded view of the finishing section of the printer shown in FIG. 3.

Turning now to FIGS. 11 and 12 for a further consideration of the programming enabling multiple finishing jobs, FIG. 11 shows the touch screen 62 display and FIG. 12 shows further details of the stitcher 122 and binder 124. Referring first to FIG. 11, jobs requiring a finishing activity are programmed in a job program mode in which there is displayed on touch screen 62 a series of icons enabling selection of various finishing options. A binding icon 194-1 is selected for jobs to be bound and 3 stitching options are enabled by icon 194-2 (single stitch), 194-3 (dual stitch) and 194-4 (landscape). These selections enable the particular operation to be accomplished in the finisher section 120. FIG. 12 shows a more detailed view of the finisher section 120. As shown, a pair of set clamps 200, 202 are mounted on a set transport charge 204 and pneumatically driven by a compressor. If a binding operation is selected (194-2), set clamp 200 removes printed sets from bin 119 and delivers to a tilt bed in binder 124 which is adapted to receive a set of copy sheets from clamp 200 and position the set of copy sheets for the binding operation. Thermal binding requires time to melt the binding adhesive and time to permit the bound set (book) to cool prior to further handling. These operations consume between 27 and 125 pitches-typically one pitch for each sheet in the set. Once the binding operation is completed, the bound sheets are raised for pickup by set clamp 202 which delivers them to stacker 125. Further details of the operation of a binder 124 are to found in U.S. Pat. No. 4,828,645 whose contents are hereby incorporated by reference.

If a stitching operation is selected at any of icons 194, set clamp 200 removes the copy sets from bin 119 and deliver them to the stitching apparatus 122. Apparatus 122 includes stitchers 210, 212, which provide either single or dual stitching of the sets. The stitchers are automatically moved to the pre-selected stitch positions by a bidirectional AC motor 214 and accurately positioned via an encoder 216. Motor 214 is located at the rear of the stitch positioning assembly. The motor drives a belt and pulley assembly to move the stitchers to the correct position. Encoder 216 is mounted above the pulley and the resulting pulses generated thereby are used by the control system to determine the amount of movement of the stitchers in order to position the staplers at the selected positions. The stitchers stitch in either of three modes; portrait, landscape, or dual stitch. Stitcher 210 is used to place a stitch in the upper left hand corner of a set of copy sheets having printed text parallel to the short edge. In the landscape mode, stitcher 212 is used to place a stitch in the upper left hand corner of a set of copy sheets with text printed parallel to the long edge. In the dual stitching mode, the stitch are placed in positions dependent upon the size of the copy sheet being run. Each stitch clamps the set of copy sheets in the stitch head, cuts and forms the wire, and drives the stitch through the set of copy sheets. A clincher bends the legs of the driven stitch over against the set of copy sheets to complete the stitch cycle.

Wire feed motors 220 and 222 rotate spools 224 and 226 to advance wire to stitchers 210 and 212, respectively, causing the wire spools 224 and 226 to rotate. The wire feed motors are located beneath each sticher head assembly. Sticker 210 and sticker 212 are substantially identical to one another. Each motor drives a pair of meshed gears. The gears have a groove around the outside circumference and the channel or hole formed by the grooves of the meshed gears drives the wire to the sticher head. Motors 220 and 222 are AC motors. Compressor 240 is driven by an AC motor and provides air pressure for the pneumatically controlled set clamps, set transport carriage and sticher. Further details of the stapler mechanism are found in copending U.S. application Ser. No. 075,706 assigned to the same assignee as the present invention and whose contents are hereby incorporated by reference. Once the stitching operation is completed, clamp 202 transports the stitched sets to stacker 125.

It is understood from the above description that multiple jobs, once programmed, are scanned and printed and finished under the overall control of the machine controller section 7. The printer controller controls all the printer steps and functions as described here including imaging onto the photoreceptor, paper delivery, xerographic functions associated with developing and transferring the developed image onto paper and, if programmed, collation of sets and delivery of collated sets to a binder or stitcher, and finally to the stacking operations. The printer controller, and more particularly the sheet scheduler, initiates a sequencing schedule which is highly efficient in monitoring the status of a series of jobs which are to be printed and finished in a consecutive fashion. The control circuitry associated with the sheet scheduling function is embodied in EDN Core 130 (FIG. 6). The sequencing schedule, utilizing various algorithms embodied in printer software, to optimize particular operations.

The sequencing schedule is predicated upon the fact that there are a maximum number of integral images which can be placed on the photoreceptor in one revolution, or cycle of the photoreceptor. Each integral image is referred to in the art as a pitch. The time interval between common events on adjacent pitches is called a pitch time. Examples of pitch time are e.g., from the start of imaging for a first image to the time of the start of imaging for a second image; or the time interval between lead edge arrival of adjacent sheets in the paper path. The sequencing schedule software can either schedule an event (imaging, paper feed, etc.), or can skip a pitch (skip pitch). The time interval associated, or corresponding to a skip pitch is a skip pitch time; controlling the total amount of skip pitches can be delayed by corresponding amounts of skip pitch time delays. Minimizing the number of print skip pitches is important in improving turnaround time and especially saving the consumables of the machine. One prior art example of optimizing of operation in a sheet scheduling mode is described in copending U.S. Patent Application (USSN 07/590,236). While this application describes one form of skip pitch time optimization, it does not take into account the skip pitch time introduced when a finishing activity is also present in the job program sequence. The optimization of entire system separation requires that the printer controller have information on skip pitches required, both in the imaging of the set sheets in a job, as well as paper path architecture and the type of finishing activity (collated set transport, set binding, stack load/unload).

With the type of multi-job streaming activity described above, some degree of job overlap is necessary in order to maintain productivity. In other words, it is inefficient to await completion of the finishing activity (arrival of bound or stitched sets at the stacker) before beginning the next job. It is also inefficient to insert into the system a fixed worst case delay between jobs. On the other hand, uncontrolled job overlapping in the finisher risks the sets in next job overtaking the sets in the current job or arriving before the hardware (binder or stitchers) has been repositioned for operation on the next set. An optimum job overlap can therefore be defined for purpose of the invention as an overlap which allows the collation of sets for the next job to be performed while the remainder of the current job is completed (finished) and the finisher hardware adjusted for the next job. In order to enable optimum overlap, and according to a first aspect of the present invention, the number of skip pitches and have skip pitch delay between scheduled jobs is minimized.

The goal of minimum skip pitches is achieved by subtracting the pitches in the first set scheduling group of the next job from the sum of the number of pitches required to complete finishing all sets of the current job and readjusting the finisher hardware to accept the requirements of the next job. Readjustment is necessary when the finishing activity is changed from, for example, binding in the current job to stitching in the next job, or vice versa. Readjustment is also necessary when the stitcher positions are changed between jobs.

According to another aspect of the present invention, job overlap from set to set in the same job is also reduced by minimizing the skip pitch time between the finishing activity performed on each set. For example, a single job may call for a plurality of sets to be bound in the finisher; depending upon the delay time associated with the binding operation, some minimum of skip pitch time must be calculated.

The information needed to calculate the minimum skip pitch for either selection is available from system controller 7 and includes: the number of simplex and duplex sheets per set in the job, the grouping (size and sequence) of simplex and duplex sheets for simple/duplex intermixed jobs, the paper path flow, constraints on set scheduling mode selected by the printer and the finisher activity selected. Set scheduling mode constraints may be applied wherein multiple copies of a set or document are to be imaged. The printer can be controlled to consecutively image multiple copies of the set or document or the printer can operate in a multiple imaging mode.

Figure 13:
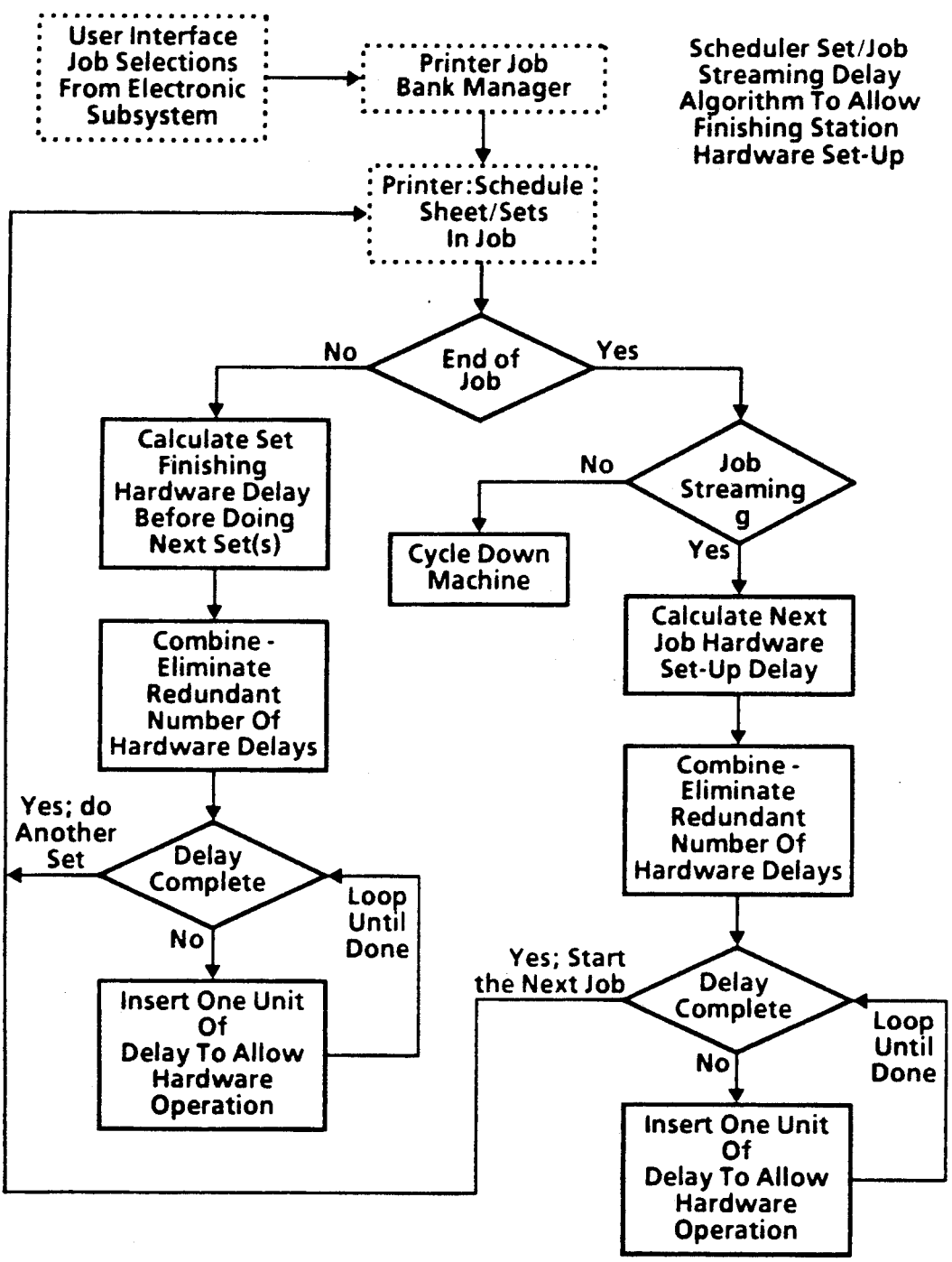
FIG. 13 is a flow chart of a job streaming delay algorithm to enable optimum job overlap between finishing operations.

Referring now to FIG. 13, there is shown a flow chart for an optimum scheduled set/job streaming delay algorithm. The computer program for determining the optimum delay for finishing sets is provided in Appendix A. As will be seen, Appendix A sets forth the following logical rules: (1) for determining the minimum delay while finishing sets within a job; (2) for determining minimum delay when changing from one hardware finishing element to another, e.g., from binding one set to stitching the next set, and vice versa; and (3) for determining the delay required to set up the finishing station hardware for the next job. The calculation encompasses the following parameters for the first job: (1) finishing selections (unfinished, bound, stitched), stitch positions (as applicable), number of sheets per set, set scheduling group used for job closeout (single, dual, triple), and stacker unload at job completion (on/off); for the next set (Job #2), finishing selections (unfinished, bound, stitched), stitch positions (as applicable), and copy sensitive job (yes/no). (A copy sensitive job is composed of non-interchangeable, non-uniform sets, each set being unique in some way.)

Referring now to FIG. 13, the job selection entered on touchscreen 62 (FIGS. 7-11) are processed by controller 7 and sent to the printer job bank manager in printer section 8. The job schedule working variables are initialized and imaging is begun on the first set of the first job. If there are additional sets to be printed in the first job, the path follows the left branch and a calculation is made to determine the sum of all the finishing hardware delays (finisher skip pitch times) which will be required to permit the second set to arrive at the finisher coincident with the completion of the finishing activity for the first set. The number of finishing hardware pitch time to complete the finishing activity on the current set is calculated as well as the minimum number of pitch times required to image the next set. When the total delay time is executed, the next job is begun and the flow again proceeds along the left side of the chart. The pitch time calculated for imaging the next set are subtracted from the pitch time required to complete the current set with the difference, if any, representing the finisher skip pitch times. The total number of finisher pitch times skips is modified by subtracting redundant hardware delay skip pitch times. The total number of finishing skip pitches are then executed one unit at a time and the complete delay is enabled. The delay is a function of controlling the imaging operation and the routing of the copy paper along the paper path to the collator. The second set of job #1 has already been scheduled by the job scheduler and has been collated and is ready for the finishing activity. The set skip finishing and delay activity is repeated for each set of the first job. When the first job is completed, the job scheduler checks to see whether or not job streaming conditions exist (is there at least a second job to be run?). If no other jobs are to be run, the system is cycled down. If there is another job, the path follows the right branch and the delay which may be required when changing from one hardware finishing element to another (selection change skip pitch times) is calculated and redundant hardware delays are eliminated. For this case, the number of pitches required to image the first set of the next job is subtracted from the sum of the number of pitches required by the finisher to complete the current job and to adjust the finisher hardware for the first set of the next job. The difference, if any, represents the selection change skip pitches required. The remaining number of selection skip pitches are executed one skip pitch time at a time; when the total delay time is executed, the next job is begun and the flow again proceeds along the left side of the flow chart.

It is apparent from the above description that optimum efficiency is realized even in the case where a single, multi-set job is run (following left branch only of FIG. 13).

Figure 14:
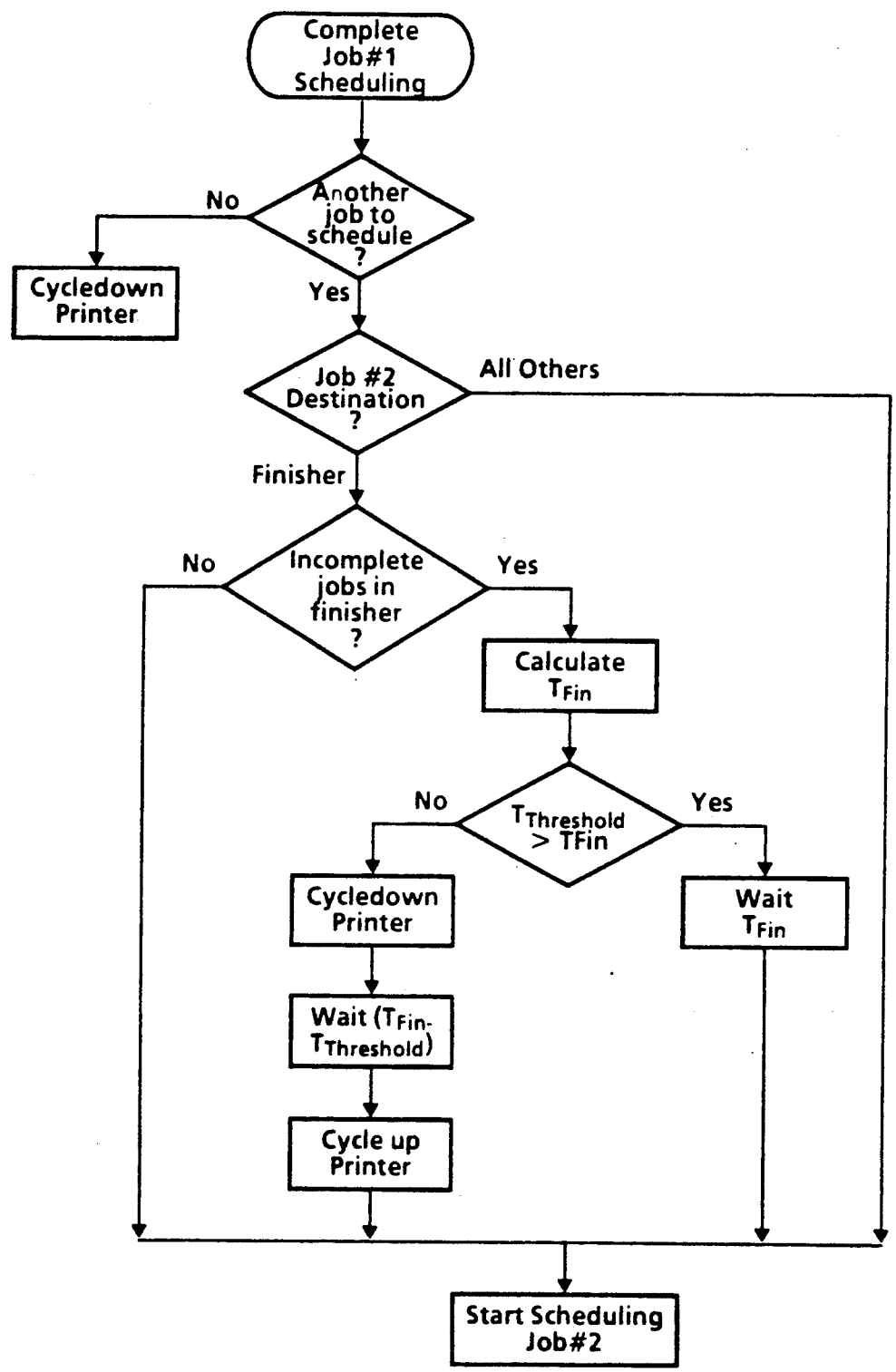
FIG. 14 is a flow chart of an algorithm to recognize finishing operations during which the system processor may be cycled down to extend life of the active components.

According to another aspect of the present invention, there may exist certain job streaming conditions wherein a current job requires finishing activities of a duration which apparently exceeds the time required to cycle down and cycle up the processor. When the cumulative number of finishing induced skip pitch times exceeds the cycle down/cycle up time by a predetermined threshold, it is possible to minimize wear on the xerographic and paper path module by cycling down the process. For example, when the current job is a bound job with large set size (number of sheets per set) and the next job is any small set sized job. In this case, the finisher operation would have a cumulative delay due to set transportation, set binding and stacker unload, and would require up require up to 250 skip pitch times (109 seconds) to complete binding for the current job. Since cycling down and cycling up time is only 30 seconds, cycle down/cycle up operation would be implemented to extend the life of all components which would otherwise continue to be used in the cycling delay mode; e.g., continual charge exposure-recharge of the photoreceptor. A flow chart to implement a cycle up/cycle down operation is shown in FIG. 14. The two values which must be determined and stored in system memory are $T_{Fin}$ and $T_{Threshold}$. $T_{Fin}$ is defined as the time required to complete finishing for the current job (job #1) and to adjust the finisher hardware to a position to receive the next job (job #2). $T_{Threshold}$ is the nominal time required to cycle down and cycle up the printer. As shown in to FIG. 14, the calculations for determining the delay between jobs begin when the scheduling sequence for job #1 has been completed. This occurs when the images of the document to be printed and bound have been compressed and stored in memory discs and the software that controls the marking engine and paper handling module has been loaded with sheet routing and finishing information for all remaining sheets in job #1. If another job is not scheduled (no job #2), the processor can be cycled down immediately. If there is a job #2, the next logical decision is whether job #2 has finishing activities. If the job is simply to print copies which are fed to output trays without collating, the scheduling for job #2 can be immediately initiated. If job #2 requires a finishing activity, the next logical operation is to determine whether there is already a finishing job in progress in the finisher (e.g., does job #1 require finishing activity). If job #1 does not have a finishing activity, again job #2 scheduling can be immediately implemented. If there is a finishing activity, then $T_{Fin}$ is computed and compared to a predetermined threshold value. If $T_{Threshold}$ is greater than $T_{Fin}$, the time duration is not long enough to justify cycling down, so operation proceeds by allowing $T_{Fin}$ to elapse and then initiating scheduling for job #2. If $T_{Threshold}$ is less than $T_{Fin}$, appropriate signals are sent to the printer sections, cycling down the processor for a time period ($T_{Fin} - T_{Threshold}$) before cycling up and beginning job #2 scheduling.

It is apparent that the determinant delay is also a function of the extent of job #2. The greatest efficiency is realized with the combination of large set size for job #1 and a small set size for job #2.

The above description of improved productivity made possible by implementation of the algorithm associated with FIG. 13 concentrated on determining the optimum number of slip pitch times to allow the finishing hardware to finish sheets or sets; e.g., stitching, binding, etc. There is an additional source of delay which is introduced by the job scheduler itself. As defined above, the function of the job scheduler is to sequence the processing of images onto the copy medium and to insert delays to permit the mechanical hardware to perform the finishing operation. However, for jobs containing duplex or a random intermix of simplex and duplex sheets, it has not been possible for a scheduler to have all the necessary information before a job is begun to determine how long it will take to schedule the sheets containing the duplex intermixed sheets. In a job streaming mode, the finisher must also known the information which will permit the finishing activity to complete the previous job before the new job is implemented. According to another aspect of the present invention, the scheduler is programmed to insert minimum delay time by calculating the total scheduling time $S_{time}$, which is defined as the total time it takes for imaging and/or hardware delays associated with scheduling one sheet jobs or multiple sheets making up the set. The hardware delay in scheduling may include delays such as inverter skips and/or delays to allow for imaging side one of a duplex sheet and time for the page imaged on side one in the paper path to reach the unimaged back side, $S_{time}$ is calculated by solving the following equations:

$$S_{time} = K(S + D_{s1} + D_{s2}) + D_{oshts} + I + H_d \tag{1}$$

Where:

$S_{time}$: = time to make a one sheet job or multiple sheet job making up a set.

K: = imaging mode factor to account for single, dual or triple flash modes.

S: = simplex sheets in set.

$D_{s1}$: = Side one of duplex sheets in set.

$D_{s2}$: = Side two of duplex sheets in set.

$D_{oshts}$: = pitches in odd multiple duplex sheets: = duplex Path Loop Size - ((K x duplexSheetsInSet)÷duplex Path Loop Size)MOD I: = skip pitch per duplex-to-simplex inverter skips.

$H_d$: = Other IOT unique hardware that consumes real scheduling time.

Equation (1) can be expanded to determine the scheduling time for multiple jobs as a function of $S_{time}$ as follows:

$$S_{total} = S_{time1} + S_{time2} + S_{time3} + S_{time\ n} + K_{ns} \tag{2}$$

Where:

$S_{total}$: = total scheduling time for given jobs $S_{time\ n}$: = the nth scheduling time for a given job $K_{ns}$: = other system related scheduling time overhead.

Figure 15:
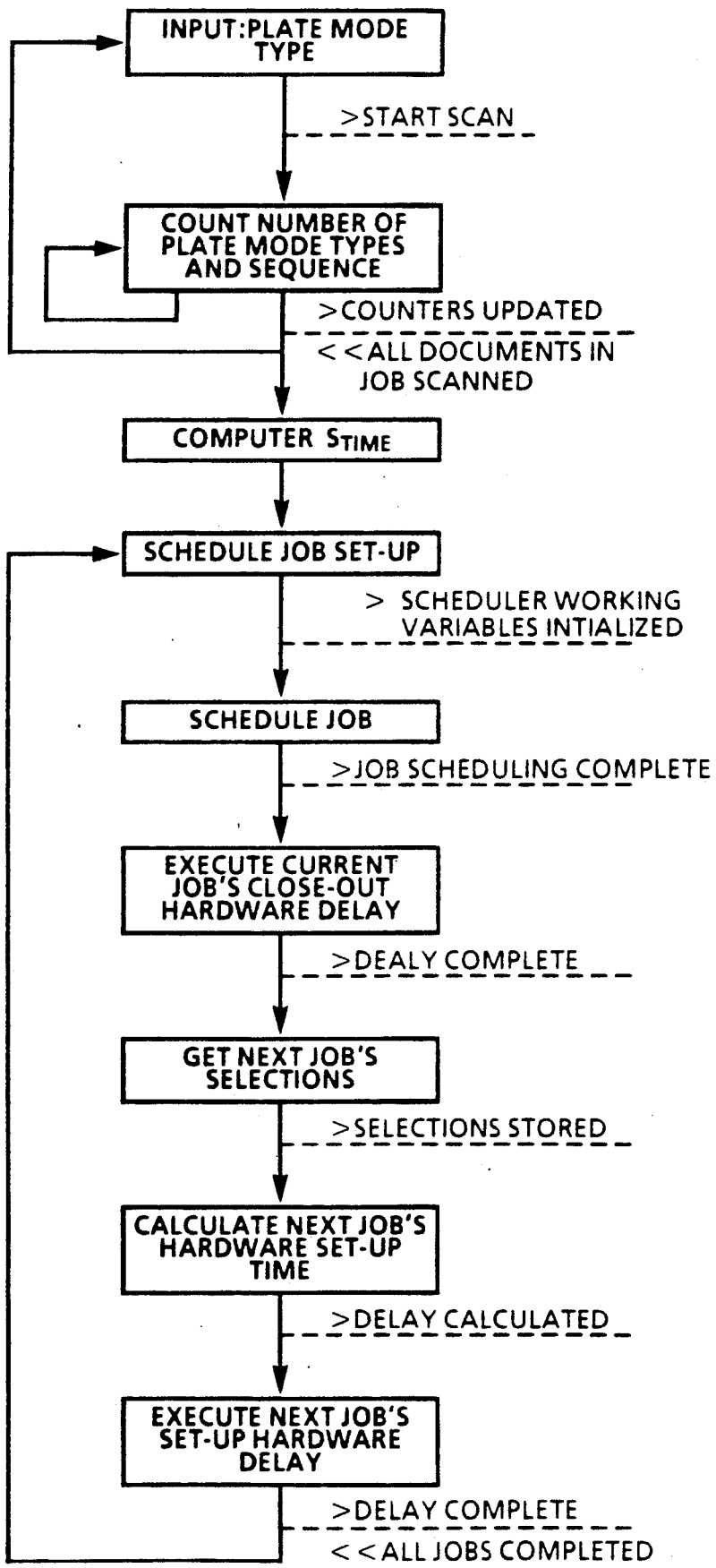
FIG. 15 is a flow chart showing scheduler productivity.

Referring now to FIG. 15, a scheduler productivity flow chart is shown. The plate mode type (simplex, duplex, number of each simplex and duplex sheet in copy and in any random order) is scanned in before the job is scheduled. With this information provided to the scheduler, all documents of the job are scanned and $S_{time}$ is computed using equations (1) and (2). This scheduler then has all the necessary information to set and schedule the job or jobs. The flow path is along the route shown, which is the same of that of FIG. 13 with the scheduler executing the required delays for all of the imaging and hardware systems.

CONCLUSION

A variety of scheduling procedures are provided by the present invention, which improves the efficiency of an electronic printing system having the capability of providing a finishing operation to a set or sets of collated printed output sheets. The delays associated with the movement of various finishing hardware components are calculated and analyzed by the job scheduler and system controller to obtain an optimum number of skip pitch times from set to set or job to job which will permit the job streaming to proceed with the least overall delay. Special circumstances which include the juxtaposition of a job having a very large finishing activity followed by a job with a smaller activity is analyzed to determine whether a total delay between job is sufficiently large to warrant a cycle down process to be initiated. Complex plate mode inputs which include duplex or a random intermix of simplex and duplex documents are also analyzed and equations are derived to provide the job schedule with sufficient information to calculate both the hardware skip pitch times as well as the skip pitches necessitated by the particular plate mode of operation.

While the invention has been described with reference to the structure disclosed, it would be appreciated that numerous changes and modifications are likely to occur to those skilled in the art. As one example, the printer may be adapted to operate in a multi-set scheduling mode wherein two or more sets forming a set scheduling group are printed concurrently. The scheduler software is then adapted to determine the number of finisher pitches required to complete finishing activity on a first set scheduling group and a number of print pitches required to print the second set scheduling group. All such modifications and changes are intended to be encompassed by following claims.

APPENDIX A

```
FinisherSetDelay: PROCEDURE[ ];
-- This procedure contains the parameters and rules for determining the delay for finishing
a set. This
-- procedure is called from EndOfSetSkips and JobStreamSkips.

ENTER
  IF destination < > finisherDestination
  THEN RETURN[0, 0];
  END IF;

IF collationMode = uncollatedStacks
  THEN binQuantity ← copiesInJob;
  ELSE binQuantity ← pagesInSet;
  END IF;

IF finishing = binding
  THEN binSkips ← 0;
  ELSE
    IF binQuantity < = 3
    THEN binSkips ← 3;
    ELSE binSkips ← 4;
    END IF;
  END IF IF collationMode = collatedSets
  THEN --
    [resultMult] ← Math.MultByte[binSkips, SetsPrintedAtATime];
    binSkips ← SHORT[resultMult];
  END IF;

If finishing = binding
  THEN
```

```
    SELECT binQuantity FROM
    CASE : select stack size to bind and the amount of time needed to bind the set;
        binderSkips ← bindConstantsForSetSize;
    END SELECT;
    [ binderSkips ] ← Math.MultWord[binderSkips, SetsPrintedAtATime];
END IF;

-- large set skips
 IF ((collationMode = collatedSets) AND (setsInBins = 2) AND (pagesInSet >= 126))
THEN largeSetSkips ← largeSetSkips Constants; END IF;

-- printmode change skips
IF SetsPrintedAtATime <> Next SetsPrintedAtATime
THEN determine print mode change constants; END IF;

timeToFinishSets ← sum of all Finisher skips
    RETURN[timeToFinishSets ];
END PROCEDURE FinisherSetDelay;
SkipCombining: PROCEDURE[];
-- This procedure is called from EndOfSetSkips to eliminate redundant hardware delays.

ENTER
    numberOfSetsRemainding ← copiesInJob - setsCompleted;

IF timeToMakeSets > timeToFinishSets
    THEN hardwareDelay ← 0;
    ELSIF -- eliminate skips at end of bind jobs
        (collationMode = collatedSets AND finishing = binding)
        AND ((numberOfSetsRemainding = 1 AND NextSetsPrintedAtATime = 1)
        OR (numberOfSetsRemainding = 2 AND NextSetsPrintedAtATime = 2))
    THEN
        hardwareDelay ← 0;
    ELSE
        hardwareDelay ← timeToMakeSets - timeToFinishSets ;
    END IF;

RETURN[hardwareDelay];
END PROCEDURE SkipCombining;

EndOfSetSkips: PROCEDURE[];
-- This procedure is called by the Scheduler when sets are ready for the finishing station.
This
-- procedure also calls procedure ExecuteDelay which is only reference but not illustrated
here.
ENTER
    IF destination = finisherDestination
    THEN
        [timeToFinishSets ] ← FinisherSetSkips[];
        [hardwareDelay] ← SkipCombining[];
        ExecuteSkip[hardwareDelay];
ELSE -- for all other destinations
    ExecuteSkip[constantSkip];
END PROCEDURE EndOfSetSkips;
```

SelectionChangeSkips: PROCEDURE[];
-- This procedure has all the rules for determining how much delay is reqiured when changing from one
-- hardware finishing element to another. This procedure is called from JobStreamSkips.

ENTER
    currentFinisherHardwareSetUp ← newFinisherHardwareSetUp;

IF (currentDestination = topTrayDestination) AND (newDestination = finisherDestination) AND
        (pitchesSinceFinisher > 0)
        -- there couldn't have been a topTrayDestination with zero pitches, only a roll over
        -- could accomplish that.
    THEN
        currentDestination ← oldDestination;
        currentFinish ← oldFinishing;
        currentPushBar ← oldPushBar;
    END IF;

SELECT currentDestination FROM
        CASE = topTrayDestination:
            SELECT nextDestination FROM
                CASE = topTrayDestination: skips ← 0;
                CASE = finisherDestination:
                    SELECT nextFinish FROM
                        CASE = noFinishing: skips ← 0;
                        CASE = portrait: skips ← 0;
                        CASE = landscape: skips ← 0;
                        CASE = dual: skips ← 0;
                        CASE = binding: skips ← 0;
                    END SELECT;
                CASE = bypassTransport: skips ← 5;
            END SELECT;
        CASE = finisherDestination:
            SELECT nextDestination FROM
                CASE = topTrayDestination:
                    SELECT currentFinish FROM
                        CASE = noFinishing: skips ← 0;
                        CASE = portrait: skips ← 0;
                        CASE = landscape: skips ← 0;
                        CASE = dual: skips ← 0;
                        CASE = binding: skips ← 0;
                    END SELECT;
SelectionChangeSkips - continue CASE = finisherDestination:
                    IF currentPushBar < > nextPushBar THEN
                        SELECT currentFinish FROM
                            CASE = NxtBk.noFinishing:
                                SELECT nextFinish FROM
                                    CASE = NxtBk.noFinishing: skips ← 0;

CASE = NxtBk.portrait:
                                    -- (nextPushBar/100 + 75)/pushBarSpeed
                                    [retQuotient] ← Math.DivWord[nextPushBar,100];
                                    localCalc ← retQuotient + 75;
                                    [intermCalc] ←

```
            Math.DivWord[localCalc,pushBarSpeed];
            [finalCalcHI,finalCalcLO] ←
            Math.MultWord[intermCalc,1000];

CASE = NxtBk.landscape, = NxtBk.dual:
        -- (230-
        nextPushBar/100)/pushBarSpeed + 4.80 + unlatchDwellTime
            [retQuotient] ← Math.DivWord[nextPushBar,100];
            localCalc ← 230 - retQuotient;
            [retQuotient] ←
            Math.DivWord[localCalc,pushBarSpeed];
            [multHI,multLO] ←
            Math.MultWord[retQuotient,1000];
            intermCalc ← multLO + 4800;
            finalCalcLO ← intermCalc + unlatchDwellTime;

CASE = NxtBk.binding: skips ← 2;    --position tilt
            bed
            END SELECT;

CASE = NxtBk.portrait:
                SELECT nextFinish FROM
                    CASE = NxtBk.noFinishing, =
                    NxtBk.binding:
        -- (230-currentPushBar/100)/pushBarSpeed + 4.80 + unlatchDwellTime
                    [retQuotient] ←
                    Math.DivWord[currentPushBar,100];
                    localCalc ← 230 - retQuotient;
                    [retQuotient] ←
                    Math.DivWord[localCalc,pushBarSpeed];
                    [multHI,multLO] ←
                    Math.MultWord[retQuotient,1000];
                    intermCalc ← multLO + 4800;
                    finalCalcLO ← intermCalc +
                    unlatchDwellTime;
                    IF nextFinish = NxtBk.binding --position
                    tilt bed
                    THEN
                        skips ← 2;
                    END IF;

CASE = NxtBk.portrait:
        --
        [(currentPushBar + nextPushBar)/100 + 150]/pushBarSpeed + revDwellTime
                    localCalc ← currentPushBar + nextPushBar;
                    [retQuotient] ←
                    Math.DivWord[localCalc,100];
                    intermCalc ← retQuotient + 150;
                    [retQuotient] ←
                    Math.DivWord[intermCalc,pushBarSpeed];
                    [multHI,multLO] ←
                    Math.MultWord[retQuotient,1000];
                    finalCalcLO ← multLO + revDwellTime;
```

SelectionChangeSkips - continue

CASE = NxtBk.landscape, = NxtBk.dual:

-- [(currentPushBar/100 + 75) + (230-nextPushBar/100)] /
pushBarSpeed + unlatchDwellTime + 4.80 + revDwellTime

[retQuotient] ←
       Math.DivWord[currentPushBar,100];
       localCalc ← 75 + retQuotient;
       [retQuotient] ←
       Math.DivWord[nextPushBar,100];
       intermCalc ← 230 - retQuotient;
       intermCalc ← intermCalc + localCalc;
       [retQuotient] ←
       Math.DivWord[intermCalc,pushBarSpeed];
       [multHI,multLO] ←
       Math.MultWord[retQuotient,1000];
       intermCalc ← multLO + unlatchDwellTime;
       intermCalc ← intermCalc + 4800;
       finalCalcLO ← intermCalc + revDwellTime;
       END SELECT;

CASE = NxtBk.landscape:
     SELECT nextFinish FROM
      CASE = NxtBk.noFinishing, = NxtBk.binding:

-- (230-currentPushBar/100)/pushBarSpeed + 4.80 + unlatchDwellTime
       [retQuotient] ←
       Math.DivWord[currentPushBar,100];
       localCalc ← 230 - retQuotient;
       [retQuotient] ←
       Math.DivWord[localCalc,pushBarSpeed];
       [multHI,multLO] ←
       Math.MultWord[retQuotient,1000];
       intermCalc ← multLO + 4800;
       finalCalcLO ← intermCalc +
       unlatchDwellTime;.
       IF nextFinish = NxtBk.binding --position
       tilt bed
       THEN
        skips ← 2;
       END IF;

CASE = NxtBk.portrait, = NxtBk.landscape, =
      NxtBk.dual:
--
[(currentPushBar + nextPushBar)/100 + 150]/pushBarSpeed + revDwellTime
       localCalc ← currentPushBar + nextPushBar;
       [retQuotient] ←
       Math.DivWord[localCalc,100];
       intermCalc ← retQuotient + 150;
       [retQuotient] ←
       Math.DivWord[intermCalc,pushBarSpeed];
       [multHI,multLO] ←
       Math.MultWord[retQuotient,1000];
       finalCalcLO ← multLO + revDwellTime;
    END SELECT;

SelectionChangeSkips - continue

```
                CASE = NxtBk.dual:
                    SELECT nextFinish FROM
                        CASE = NxtBk.noFinishing, = NxtBk.binding:
-- (230-currentPushBar/100)/pushBarSpeed + 4.80 + unlatchDwellTime
                            [retQuotient] ←
                            Math.DivWord[currentPushBar,100];
                            localCalc ← 230 - retQuotient;
                            [retQuotient] ←
                            Math.DivWord[localCalc,pushBarSpeed];
                            [multHI,multLO] ←
                            Math.MultWord[retQuotient,1000];
                            intermCalc ← multLO + 4800;
                            finalCalcLO ← intermCalc + unlatchDwellTime;
                            IF nextFinish = NxtBk.binding   --position tilt
                            bed
                            THEN
                                skips ← 2;
                            END IF;

CASE = NxtBk.portrait, = NxtBk.landscape, =
                        NxtBk.dual:
-- [(currentPushBar + nextPushBar)/100 + 150]/pushBarSpeed + revDwellTime localCalc ← currentPushBar + nextPushBar;
                            [retQuotient] ← Math.DivWord[localCalc,100];
                            intermCalc ← retQuotient + 150;
                            [retQuotient] ←
                            Math.DivWord[intermCalc,pushBarSpeed];
                            [multHI,multLO] ←
                            Math.MultWord[retQuotient,1000];
                            finalCalcLO ← multLO + revDwellTime;
                    END SELECT;

CASE = NxtBk.binding:
                SELECT nextFinish FROM
                    CASE = NxtBk.noFinishing: skips ← 2;  --park tilt bed CASE = NxtBk.portrait:
-- (nextPushBar/100 + 75)/pushBarSpeed

[retQuotient] ← Math.DivWord[nextPushBar,100];
                            localCalc ← retQuotient + 75;
                            [intermCalc] ←
                            Math.DivWord[localCalc,pushBarSpeed];
                            [finalCalcHI,finalCalcLO] ←
                            Math.MultWord[intermCalc,1000];
                            skips ← 2;  --park tilt bed
                    CASE = NxtBk.landscape, = NxtBk.dual:
-- (230-nextPushBar/100)/pushBarSpeed + 4.80 + unlatchDwellTime

[retQuotient] ← Math.DivWord[nextPushBar,100];
                            localCalc ← 230 - retQuotient;
                            [retQuotient] ←
                            Math.DivWord[localCalc,pushBarSpeed];
                            [multHI,multLO] ←
```

```
                    Math.MultWord[retQuotient,1000];
                    intermCalc ← multLO + 4800;
                    finalCalcLO ← intermCalc + unlatchDwellTime;
                    skips ← 2; --park tilt bed CASE = NxtBk.binding: skips ← 0;
                END SELECT;
END SELECT;
SelectionChangeSkips - continue finalCalcHI ← 0;
        [finalCalcHI,finalCalcLO] ← Math.DivDword[finalCalcHI,finalCalcLO,446];

IF finalCalcLO + NORMAL[skips] > 255 THEN
          skips ← 255;
        ELSE
          skips ← LSB[finalCalcLO] + skips;
        END IF;
     ELSE
       IF (currentFinish = NxtBk.noFinishing AND nextFinish = NxtBk.binding) OR
          (currentFinish = NxtBk.binding AND nextFinish = NxtBk.noFinishing)
        THEN
          skips ← 2;
        END IF;
     END IF;
CASE = bypassTransport: skips ← 0;
   END SELECT;
  CASE = bypassTransport: skips ← 5;
  END SELECT;
  RETURN[skips];
END PROCEDURE SelectionChangeSkips;
JobStreamSkips: PUBLIC PROCEDURE[] = ;
-- This procedure is called from the Scheduler at the end of a job when job streaming. This procedure
-- determines the delay required to set-up the finishing station devices for the next job taking into
-- account the current usage of the finishing station elements. This procedure calls
FinisherSetSkips, SelectionChangeSkips. This procedure also calls procedures EliminateRedundentDelay and
ExecuteDelay; these two procedures are only referenced but not illustrated here.

ENTER
 IF destination = finisherDestination
 THEN -- save selections
      oldFinisherHardwareSetUp ← currentFinisherHardwareSetUp
 ELSIF destination = topTrayDestination
 THEN
   [hiMult, loMult] ← Math.MultWord[pagesInSet, copiesInJob];
   IF (hiMult < > 0)
   THEN -- roll over
     pitchesSinceLastFinisherDelay ← 0;
       oldtimeToFinishSets ← 0; oldStackerUnloadSkips ← 0;
   ELSE
     pitchesSinceLastFinisherDelay ← pitchesSinceLastFinisherDelay + loMult;
   END IF;
END IF;
```

```
[newConCurrentSets] ← NextJobConcurrency[];

IF destination = finisherDestination
THEN [timeToFinishSets] ← FinisherSetSkips[];
ELSE timeToFinishSets ← 0 ;
END IF;

[newtimeToFinishSets ] ← SelectionChangeSkips[];

IF (destination = finisherDestination) AND (NOT unloadAtCapacity)
THEN stackerUnloadSkips ← 40;
ELSE stackerUnloadSkips ← 0;
END IF;

IF newDestination = topTrayDestination
THEN
  IF destination = finisherDestination
  THEN
          oldtimeToFinishSets ← timeToFinishSets;
          oldStackerUnloadSkips ← stackerUnloadSkips;
  END IF;
          timeToFinishSets ← 0;
          stackerUnloadSkips ← 0;
ELSIF (destination = topTrayDestination) AND (newDestination = finisherDestination)
THEN
      timeToFinishSetsskips ← oldtimeToFinishSets ;
      stackerUnloadSkips ← oldStackerUnloadSkips ;
END IF;

finisherBinMovement ← 0;
JobStreamSkips - continue

IF stackerUnloadSkips + newtimeToFinishSets > 0
  THEN -- unload the finishing station (bin d)
      IF pagesInSet > = 4
        THEN finisherBinMovement ← 4;
        ELSE finisherBinMovement ← 3;
        END IF;
  END IF;

timeToFinishSets ← ( timeToFinishSets + stackerUnloadSkips
+ newtimeToFinishSets + finisherBinMovement);

IF (destination = topTrayDestination) AND (newDestination = finisherDestination)
  THEN
    IF pitchesSinceLastFinisherDelay > timeToFinishSets
    THEN timeToFinishSets ← 0;
    ELSE
      timeToFinishSets ← timeToFinishSets - pitchesSinceLastFinisherDelay;
        pitchesSinceLastFinisherDelay ← 0;
    END IF;
  END IF;

[timeToFinishSets ] ← EliminateRedundentDelay[timeToFinishSets ];

ExecuteDelay[timeToFinishSets ];
END PROCEDURE JobStreamSkips
```

We claim:

1. In an electronic printer having a copy set finisher wherein at least first and second consecutively printed sets are provided with a specified finishing activity, a method of optimizing set overlap in said finisher including the steps of:
  determining a number of finisher pitches required to complete finishing activity on a first set,
  determining a number of print pitches required to print a second set, and
  subtracting the print pitches from the finisher pitches to obtain a minimum number of finisher skip pitches and delaying arrival of the second set to the finisher by a time interval corresponding to said finisher skip pitches.

2. The printer of claim 1 wherein said first and second sets are finished within a single job.

3. The printer of claim 1 wherein said printer is operated in a job streaming mode and wherein said first set is a last set of a first job and said second set is a first set of a second job, including the further steps of:
  determining a number of selection change pitches required to change the finishing activity being performed on the first set of the first job to the finishing activity to be performed on the first set of the second job,
  determining the print pitches required to print the second set,
  adding said selection change pitches to the finisher pitches, and
  subtracting said print pitches from a sum of the finisher and selection change pitches to determine a minimum number of selection change skip pitches, and
  delaying the finishing activity in said first set of said second job by a time interval corresponding to the number of selection change skip pitches.

4. In an electronic printer having a copy set finisher wherein at least first and second consecutively printed sets are provided with a finishing activity in said finisher including, in combination:
  means to determine a minimum number of skip pitches between successive finishing activities associated with at least a first and second set, and
  means to delay start of the finishing activity for said second set by said minimum number of skip pitches wherein finishing activity for the first set is completed before finishing activity for the second set is started.

5. The printer of claim 4 wherein the printer is operated in a job streaming mode having at least a first and second job and wherein said first set is a last set of a first job and said second set is a first set of a second job.

6. The printer of claim 4 wherein said determining means includes means for calculating a first number of pitches required to complete the first set and for calculating a second number of pitches required to print the second set, and for calculating a difference between said first and second pitch numbers, the difference being equal to a minimum number of skip pitches.

7. The printer of claim 5 wherein said determining means includes means for calculating a number of pitches required to complete the first set and for adding the number of pitches required to print the second set to a number of pitches required to change from the finishing activity being performed on the first set which is the last set of the first job to the finishing activity to be performed on the second set.

8. An electronic reprographic apparatus for scanning, processing, printing and finishing at least a first and second job in a job streaming mode of operation comprising:
  scanner means for scanning at least a first and second set of original documents which comprise at least said first job;
  storage means adapted to store image data of said documents for current and subsequent processing,
  printer means for printing copies of said stored image data,
  finisher means for collating said printed copies into at least said first and second sets, said finisher means further adapted to secure each of said sets by means of a selected finishing activity, and
  controller means for controlling operation of the scanner, storage, printer and finishing means, said controller means including job scheduling means for determining a minimum number of finishing skip pitches required to prevent job overlap in said finishing means.

9. The apparatus of claim 8 wherein the job scheduling means enables an algorithmic routine for determining time delays associated with said minimum number of finishing skip pitches and delaying the second set of the first job to arrive at a finisher nearly coincident with the finishing activity for the first set.

10. The apparatus of claim 9 wherein said algorithmic routine further determines redundant hardware delay times associated with the finishing activity and subtracts redundant hardware delay pitches from a total number of finishing skip pitches.

11. The apparatus of claim 10 wherein said job scheduling means further includes means for scheduling the first set of at least the second job and calculating selection change skip pitches necessitated by a time interval associated with changing from one finishing activity to another.

12. The apparatus of claim 8 wherein at least a first and second job have been scheduled and wherein the controller means is adapted to calculate whether a time $T_{FIN}$ required to complete finishing of the first job and to adjust the finisher so as to receive the second job is greater than a time $T_{THRESHOLD}$ required to cycle down and cycle up the printer and to generate a signal to be sent to the controller means to cycle down the apparatus for a time period of $T_{FIN}-T_{THRESHOLD}$.

13. The apparatus of claim 8 wherein said original documents include plate mode type of sheets containing simplex and duplex sheets intermixed in a random order and wherein said controller means is adapted to preview each job before scanning is initiated to determine $S_{time}$ which is
  defined as a total delay time required for imaging, printing and finishing activities associated with said documents being printed.

14. The apparatus of claim 13 wherein $S_{time}$ is defined by the equation:

$$S_{time} = K(S + D_{s1} + D_{s2}) + D_{oshts} + 1 + H_d$$

Where:
  $S_{time}$ = time to make a one sheet job or multiple sheet job making up a set,
  K: = imaging mode factor to account for single, dual or triple flash modes,
  S: = simplex sheets in set, $D_{s1}$: = Side one of duplex sheets in set,
$D_{s2}$: = Side two of duplex sheets in set,
$D_{oshts}$: = pitches in odd multiple duplex sheets: = duplex Path Loop Size - ((K x duplexSheetsInSet) ÷ duplex PathLoopSize)MOD
l: = skip pitch per duplex-to-simplex inverter skips,
$H_d$: = Other IOT unique hardware that consumers real scheduling time.

15. The apparatus of claim 13 wherein there are multiple job scheduled, each job including said plate mode types of sheets containing and including said plate mode types and wherein said $S_{time}$ is expanded to the equation:

$$S_{total} = S_{time1} + S_{time2} + S_{time3} + K_{ns}$$

Where:
$S_{total}$: = total scheduling time for given jobs
$S_{time\ n}$: = an nth scheduling time for a given job
$K_{ns}$: = other system related scheduling time overhead.

16. A method of operating an electronic printer in a multi-job streaming mode including at least a first and second job to make at least first and second finished sets of documents comprising the steps of:
programming the printer with printing and finishing instructions for each job,
scanning a plurality of document pages comprising each of said at least first and second jobs and converting the scanned pages into electronic pages,
combining said electronic pages of each job with the printing and finishing instructions to provide job files for each of said jobs,
storing said job files in memory pending printing.
forming a print queue with said jobs in a preset printing priority for successive accessing of print files thereof when printing said jobs,
printing said jobs successively and forming a job collating queue comprising at least a first and second collated set of printed copies,
providing a set securing finishing activity and
automatically calculating a total number of finishing skip pitch times to determine an optimum time to commence printing and collating of stored electronic signals such that the finishing actually being performed on a first set is completed and the second collated set ready to be accepted for the finishing activity with a minimum finishing delay time.

17. The method of claim 16 including the further steps of:
determining, following completion of the first job, whether the first set of the second job has a finishing activity enabled by associated finishing hardware which is different from the finishing activity, associated with a first job, and
calculating the delay required to adjust the finishing hardware to the finishing activity of said first set of said second job.

18. The method of claim 17 including the further steps of determining, following completion of the first job, whether the first set of the second job has a finishing activity,
calculating $T_{FIN}$ defined as a time interval required to complete the finishing activity for the first job, and cycling down the printer if $T_{FIN}$ is found to exceed a $T_{THRESHOLD}$ time defined as a nominal time required to cycle down and cycle up the printer to allow the second job to be printed and finished with a minimum finishing skip pitch delay.

19. The method of claim 16 wherein said original documents include plate mode types of single and duplex sheets interleaved in a random order and further including a step of calculating total scheduling time $S_{time}$ defined as a total of imaging and hardware delays associated with processing said original plate mode types of documents.

20. The method of claim 19 wherein $S_{time}$ is defined by the equation:

$$S_{time} = K(S + D_{s1} + D_{s2}) + D_{oshts} + 1 + H_d$$

Where:
$S_{time}$ = time to make a one sheet job or multiple sheet job making up a set,
K: = imaging mode factor to account for single, dual or triple flash modes,
S: = simplex sheets in set,
$D_{s1}$: = Side one of duplex sheets in set,
$D_{s2}$: = Side two of duplex sheets in set,
$D_{oshts}$: = pitches in odd multiple duplex sheets: = duplex Path Loop Size - ((K x duplexSheetsInSet) ÷ duplex PathLoopSize)MOD
l: = skip pitch per duplex-to-simplex inverter skips,
$H_d$: = Other IOT unique hardware that consumers real scheduling time.

21. The method of claim 19 including an additional step of calculating total scheduling time for the multiple jobs as a function of $S_{time}$ by solving the equation:

$$S_{total} = S_{time1} + S_{time2} + S_{time3} + K_{ns}$$

Where:
$S_{total}$: = total scheduling time for given jobs
$S_{time\ n}$: = an nth scheduling time for a given job
$K_{ns}$: = other system related scheduling time overhead.

22. In an electronic printing system including a printer for processing at least a first and second job in a job streaming mode, a collator for collating at least a first and second set of output prints and a stapler or binder and a finisher for stitching or binding said collated sets,
the combination of:
means for calculating a minimum delay, measured in finisher skip pitch times between successive jobs requiring a finishing activity by calculating a number of pitches required to complete the finishing of a first set in a first job and subtracting this number from a number of pitches required to bring the second set into finishing position within the collator to determine a minimum skip pitch time, and
control means for delaying arrival of the second set to the finisher by a time delay corresponding to said minimum skip pitch time.

23. The printing system of claim 22 wherein said second set is the first set of the second job in a job stream, and wherein said second set requires a finishing activity which is different from a previous set and wherein said minimum skip pitch time calculated by said calculating means includes a number of skip pitches associated with movement of hardware within the finisher to accommodate changes in the finishing activity from job to job.

24. In an electronic printer having a copy set finisher wherein two or more sets forming a set scheduling group are to be printed concurrently in a multi-set scheduling mode, a method of optimizing set overlap in said finisher including the steps of:
  determining a number of finisher pitches required to complete finishing activity on a first set scheduling group,
  determining a number of print pitches required to print the second set scheduling group,
  subtracting the print pitches from the finisher pitches to obtain a minimum number of finisher skip pitches, and
  delaying arrival of the second set scheduling group to the finisher by a time interval corresponding to said finisher skip pitches.

* * * * *